United States Patent
Livingston et al.

(10) Patent No.: US 10,434,479 B2
(45) Date of Patent: Oct. 8, 2019

(54) COMPOSITE MEMBRANES HAVING INTRINSIC MICROPOROSITY

(71) Applicant: IP2IPO INNOVATIONS LIMITED, London (GB)

(72) Inventors: Andrew Guy Livingston, London (GB); Maria Fernanda Jimenez Solomon, London (GB)

(73) Assignee: IP2IPO Innovations Limited, London (GB)

( * ) Notice: Subject to any disclaimer, the term of this patent is extended or adjusted under 35 U.S.C. 154(b) by 275 days.

(21) Appl. No.: 14/352,074

(22) PCT Filed: Oct. 18, 2012

(86) PCT No.: PCT/GB2012/052576
§ 371 (c)(1),
(2) Date: Apr. 16, 2014

(87) PCT Pub. No.: WO2013/057492
PCT Pub. Date: Apr. 25, 2013

(65) Prior Publication Data
US 2014/0251897 A1    Sep. 11, 2014

(30) Foreign Application Priority Data

Oct. 18, 2011 (GB) .................................. 1117950.4

(51) Int. Cl.
*B01D 71/72* (2006.01)
*B01D 67/00* (2006.01)
(Continued)

(52) U.S. Cl.
CPC ........... *B01D 71/72* (2013.01); *B01D 53/228* (2013.01); *B01D 67/0006* (2013.01);
(Continued)

(58) Field of Classification Search
CPC .... B01D 71/72; B01D 71/48; B01D 67/0006; B01D 67/0088; B01D 53/228;
(Continued)

(56) References Cited

U.S. PATENT DOCUMENTS 4,259,183 A * 3/1981 Cadotte ................ B01D 69/125
  210/500.28
4,861,480 A * 8/1989 Berardo ............. B01D 67/0093
  210/490

(Continued)

FOREIGN PATENT DOCUMENTS

WO    2005/012397    2/2005
WO    2005/113121    12/2005

OTHER PUBLICATIONS

Holst, James R., Abbie Trewin, and Andrew I. Cooper. 2010. "Porous organic molecules." Nature Chemistry 2, No. 11: 915-920. Academic Search Complete, EBSCOhost (accessed Aug. 2, 2016).*

(Continued)

*Primary Examiner* — Lucas A Stelling
*Assistant Examiner* — Angel Olivera
(74) *Attorney, Agent, or Firm* — Barnes & Thornburg LLP

(57) ABSTRACT

The present invention relates to a composite membrane for gas separation and/or nanofiltration of a feed stream solution comprising a solvent and dissolved solutes and showing preferential rejection of the solutes. The composite membrane comprises a separating layer with intrinsic microporosity. The separating layer is suitably formed by interfacial polymerization on a support membrane. Suitably, at least one of the monomers used in the interfacial polymerization reaction should possess concavity, resulting in a network polymer with interconnected nanopores and a membrane with enhanced permeability. The support membrane may be optionally impregnated with a conditioning agent and may (Continued)

be optionally stable in organic solvents, particularly in polar aprotic solvents. The top layer of the composite membrane is optionally capped with functional groups to change the surface chemistry. The composite membrane may be cured in the oven to enhance rejection. Finally, the composite membrane may be treated with an activating solvent prior to nanofiltration.

14 Claims, 15 Drawing Sheets

(51) Int. Cl.
   B01D 69/10    (2006.01)
   B01D 69/12    (2006.01)
   B01D 71/48    (2006.01)
   B01D 53/22    (2006.01)
   B01D 61/02    (2006.01)

(52) U.S. Cl.
   CPC ..... B01D 67/0083 (2013.01); B01D 67/0088 (2013.01); B01D 67/0093 (2013.01); B01D 69/105 (2013.01); B01D 69/125 (2013.01); B01D 71/48 (2013.01); B01D 61/027 (2013.01); B01D 2323/30 (2013.01); B01D 2323/40 (2013.01); B01D 2325/02 (2013.01)

(58) Field of Classification Search
   CPC .............. B01D 67/0093; B01D 69/125; B01D 67/0083; B01D 69/105; B01D 2323/40; B01D 61/027; B01D 2323/30; B01D 2325/02; B01D 69/12; B01D 2323/345; B01D 71/028; Y10T 428/249977
   See application file for complete search history.

(56) References Cited

U.S. PATENT DOCUMENTS

| | | | | |
|---|---|---|---|---|
| 4,919,811 | A * | 4/1990 | Davis | B01D 67/0011 210/500.36 |
| 5,352,273 | A | 10/1994 | Simmons et al. | |
| 6,180,008 | B1 * | 1/2001 | White | B01D 61/02 208/308 |
| 7,410,525 | B1 * | 8/2008 | Liu | B01D 53/228 210/500.27 |
| 7,758,751 | B1 * | 7/2010 | Liu | B01D 53/228 210/321.6 |
| 2003/0180425 | A1 * | 9/2003 | Sanchez | B01D 53/228 426/419 |
| 2006/0156920 | A1 * | 7/2006 | Ekiner | B01D 53/228 95/45 |
| 2010/0038306 | A1 | 2/2010 | Livingston et al. | |
| 2011/0189469 | A1 | 8/2011 | Stenzel et al. | |

OTHER PUBLICATIONS

Peter M. Budd, Kadhum J. Msayib, Carin E. Tattershall, Bader S. Ghanem, Kevin J. Reynolds, Neil B. McKeown, Detlev Fritsch, Gas separation membranes from polymers of intrinsic microporosity, Journal of Membrane Science, vol. 251, Issues 1-2, Apr. 1, 2005, pp. 263-269, ISSN 0376-7388, http://dx.doi.org/10.1016/j.memsci.2005.01.009.*

P. M Budd et. al., Microporous polymeric materials, Materials Today, vol. 7, Issue 4, Apr. 2004, pp. 40-46, ISSN 1369-7021, http://dx.doi.org/10.1016/S1369-7021(04)00188-9 (http://www.sciencedirect.com/science/article/pii/S1369702104001889).*

P. M Budd et. al., Polymers of intrinsic microporosity (PIMs): robust, solution-processable, organic nanoporous materials A1—Budd, Peter M., Chemical Communications (2004), Is. 2, p. 230-231, DOI 10.1039/B311764B, available at http://dx.doi.org/10.1039/B311764B (accesesed Feb. 16, 2017).*

International Search Report/Written Opinion for PCT/GB2012/052576, dated Mar. 1, 2013.

McKeown, 2012, Review Article: Polymers of Intrinsic Microporosity, International Scholarly Research Network, vol. 2012, Article ID 513986, pp. 1-16.

Budd et al., "Polymers of Intrinsic Microporosity (PIMs): High Free Volume Polymers for Membrane Applications", Macromol. Symp. 2006, 245-246, pp. 403-405.

Jayarani et al., "Thin-film composite poly(esteramide)-based membranes," Desalination 130 (2000), pp. 17-30.

Kim et al., "Positron Annihilation Spectroscopic Evidence to Demonstrate the Flux-Enhancement Mechanism in Morphology-Controlled Thin-Film-Composite (TFC) Membrane", Environ. Sci. Technol., 2005, 39, pp. 1764-1770.

Kim et al., "Preparation of Interfacially Synthesized and Silicone-Coated Compositie Polyimide Nanofiltration Membranes with High Performance", Ind. Eng. Chem. Res. 2002, 41, pp. 5523-5528.

Kuehne et al., "Flux Enhancement in TFC RO Membranes", Environmental Progress (vol. 20, No. 1), Apr. 2001, pp. 23-26.

Kwak et al., "Structure-Motion-Performance Relationship of Flux-Enhanced Reverse Osmosis (RO) Membranes Composed of Aromatic Polyamide Thin Films", Environ. Sci. Technol., 2001, 35, pp. 4334-4340.

Mukherjee et al., "Chemical treatment for improved performance of reverse osmosis membranes," Desalination 104 (1996), pp. 239-249.

Razdan et al., "Nanofiltration thin-film-composite polyesteramide membranes based on bulky diols", Desalination 161 (2004) pp. 25-32.

Riley et al., "Spiral-Wound Poly(Ether/Amide) Thin-Film Composite Membrane Systems", Desalination, 19 (1976), pp. 113-126.

Belfer et al., "Surface modification of commercial composite polyadmid reverse osmosis membranes", Journal of Membrane Science.

Chen et al., "Preparation and Separation Properties of Polyamide Nanofiltration Membrane", Journal of Applied Polymer Science, vol. 83, 1112-1118 (2002).

Freger et al., "TFC polyamide membranes modified by grafting of hydrophilic polymers: an FT-IR/AFM/TEM study", Journal of Membrane Science 209, 2002, pp. 283-292.

Koseoglu et al., "Membrane Processing of Crude Vegetable Oils: Pilot Plant Scale Removal of Solvent from Oil Miscellas", J. Am. Oil Chem. Soc., vol. 67. No. 5, May 1990, pp. 315-322.

Kulkarni et al., "Flux enhancement of hydrophilization of thin film composite reverse osmosis membranes", Journal of Membrane Science 114, 1996, pp. 39-50.

Liu et al,. "Characterization of morphology controlled polyethersulfone hollow fiber membranes by the addition of polyethylene glycol to the dope and bore liquid solution", Journal of Membrane Scienc 223, 2003, pp. 187-199.

Mukherjee et al., "Flux enhancement of reverse osmosis membranes by chemical surface modification", Journal of Membrane Science 97, 1994, pp. 231-249.

Petersen, "Composite reverse osmosis and nanofiltration membranes," Journal of Membrane Science, 83, 1993, pp. 81-150.

Sforca et al., "Composite nanofiltration membranes prepared by in situ polycondensation of amines in a poly(ethylene oxide-b-amide) layer", Journal of Membrane Science 135, 1997, 179-186.

Ghanem et al., "Synthesis, Characterization, and Gas Permeation Properties of a Novel Group of Polymers with Intrinsic Microporosity: PIM-Polyimides", Macromolecules 2009, 42, pp. 7881-7888.

Ghosh et al., "Impacts of reaction and curing conditions on polyamide composite reverse osmosis membrane properties", Journal of Membrane Science 311, 2008, pp. 34-45.

Kang et al., "A novel method of surface modification on thin-film composite reverse osmosis membrane by grafting poly(ethylene glycol)", Polymer 48, 2007, pp. 1165-1170.

Kim et al., Effect of Aqueous and Organic Solutions on the Performance of Polyamide Thin-Film-Composite Nanofiltration Membranes, Journal of Polymedr Science, vol. 40, pp. 2151-2163, 2002.

(56) References Cited

OTHER PUBLICATIONS

Long et la., "Minimization of Free Volumne: Alignment of Triptycenes in Liquid Crystals and Sretched Polymers", Advanced Materials, vol. 13, No. 8, Apr. 2001, pp. 601-603.

Lu et al., "Preparation and characterization of NF composite membrane", Journal of Membrane Science 210, 2002, pp. 3-11.

McKeown et al., "Exploitation of Intrinsic Microporosity in Polymer-Based Materials", Macromolecules 2010, 43, pp. 5163-5176.

Tarboush et al., "Preparation of thin-film-composite polyamide membranes for desalination using novel hydrophilic surface modifying macromolecules ", Journal of Membrane Science 325, 2008, pp. 166-175.

Wavhal et al., "Membrance Surface Modification by Plasma-Induced Polymerization of Acrylamide for Improved Surface Properties and Reduced Protein Fouling", Langmuir 2003, 19, pp. 79-85.

Budd et al., "Highly permeable polymers for gas separation membranes", Polymer Chemistry, 2010, 1, pp. 63-68.

Ulbricht, "Advanced Functional Polymer Membranes", Polymer 47, 2006, pp. 2217-2262.

\* cited by examiner

COMPOSITE MEMBRANES HAVING INTRINSIC MICROPOROSITY

CROSS-REFERENCE TO RELATED APPLICATIONS

This application is a national stage entry under 35 USC § 371(b) of PCT International Application No. PCT/GB2012/052576, filed Oct. 18, 2012, which claims priority to United Kingdom Patent Application No. 1117950.4, filed Oct. 18, 2011, the entire disclosures of both of which are incorporated herein by reference.

The work leading to this invention has received funding from the European Union Seventh Framework Programme (FP7/2007-2013) under grant agreement no 241226.

FIELD OF INVENTION

The present invention relates to separation membranes. More specifically, the present invention relates to thin film composite membranes comprising a support membrane coated with a separating layer, wherein the separating layer comprises a network polymer possessing intrinsic microporosity. The present invention also relates to processes for the preparation of these membranes and their use in a variety of applications, including, but not limited to, gas separation, pervaporation, nanofiltration, desalination and water treatment, and particularly the nanofiltration of solutes dissolved in organic solvents.

BACKGROUND TO THE INVENTION

Membrane processes have been widely applied in separation science, and can be applied to a range of separations of species of varying molecular weights in liquid and gas phases (see for example "Membrane Technology and Applications" 2$^{nd}$ Edition, R. W. Baker, John Wiley and Sons Ltd, ISBN 0-470-85445-6).

With particular reference to nanofiltration, such applications have gained attention based on the relatively low operating pressures, high fluxes and low operation and maintenance costs associated therewith. Nanofiltration is a membrane process utilising membranes with molecular weight cut-off in the range of 200-2,000 Daltons. Molecular weight cut-off of a membrane is generally defined as the molecular weight of a molecule that would exhibit a rejection of 90% when subjected to nanofiltration by the membrane.

Membranes for nanofiltration, pervaporation and gas separation are generally fabricated by making composite membranes. Thin film composite membranes may be fabricated via interfacial polymerization (herein also referred to as IP) or by coating [Lu, X.; Bian, X.; Shi, L., "*Preparation and characterization of NF composite membrane.*" *J. Membr. Sci.*, 210, 3-11, 2002].

In glassy polymers, gas permeability depends strongly on the amount and distribution of free volume in the polymer (i.e. the space not occupied by polymer molecules) and on chain mobility. In liquid applications when using defect-free thin film composite membranes, high free volume leads to high permeability. Polymers with the highest permeabilities have rigid, twisted macromolecular backbones that give rise to microvoids. When the free volume is very high, these microvoids are interconnected resulting in intrinsic microporosity. Here, microporous materials are solids having interconnected pores of less than 2 nm in size [Handbook of Porous Solids, Schuth F, Sing K, Weitkamp J. Eds. Wiley-VCH; Berlin 2002, Vols 1-5]. This size of porosity is also commonly referred to as nanoporosity, and materials with this microporosity are referred to as being nanoporous.

To achieve very high permeabilities, high free volume and microporosity are sought after. Polymers presenting these properties are so-called high free volume polymers. These highly permeable polymers have been applied mostly to gas separations. Some examples include certain substituted polyacetylenes (e.g. PTMSP), some perfluoropolymers (e.g. Teflon AF), certain poly(norbornene)s, polymers of intrinsic microporosity, and some polyimides. Their microporosity has been demonstrated by molecular modelling and positron lifetime spectroscopy (PALS). Highly permeable polyacetylenes have bulky side groups that inhibit conformational change and force the backbone into a twisted shape. These rigid polymer macromolecules cannot pack properly in the solid state, resulting in high free volume. The free volume distribution comprises disconnected elements as in glassy polymers and continuous microvoids. In Teflon perfluoropolymers their high free volume is due to a high barrier to rotation between neighbouring dioxolane rings, coupled with weak interchain interactions, which are well known for fluoropolymers, leading to low packing density and hence high permeability. In the case of poly(norborene)s and PTMSP, the presence of bulky trimethylsilyl groups on the ring greatly restricts the freedom of the polymer to undergo conformational change. In polymers of intrinsic microporosity (PIMs), molecular linkers containing points of contortion are held in non-coplanar orientation by rigid molecules, which do not allow the resulting polymers to pack closely and ensure high microporosity. The PIMs concept has been reported for polymides [P M Budd and N B McKewon, "*Highly permeable polymers for gas separation membranes, Polymer Chemistry*, 1, 63-68, 2010].

There are two different types of PIMs, i) non-network (linear) polymers which may be soluble in organic solvents, and ii) network polymers which are generally insoluble, depending on the monomer choice. PIMs possess internal molecular free volume (IMFV), which is a measure of concavity and is defined by Swager as the difference in volume of the concave unit as compared to the non-concave shape [T M Long and T M Swager, "Minimization of Free Volume: Alignment of Triptycenes in Liquid Crystals and Stretched Polymers", *Adv. Mater,* 13, 8, 601-604, 2001]. While the intrinsic microporosity in linear PIMs is claimed to derive from the impenetrable concavities given by their contorted structures, in network PIMs, microporosity is also claimed to derive from the concavities associated with macrocycles. In non-network PIMs, rotation of single bonds has to be avoided, whereas the branching and crosslinking in network PIMs is thought to avoid structural rearrangement that may result in the loss of microporosity (McKeown, 2010), so that single bonds can be present without loss of microporosity. In general, it has been observed that network PIMs possess greater microporosity than non-network PIMs due to their macrocyclization [N B McKewon, P M Budd, "*Explotation of Intrinsic Microporosity in Polymer-Based materials*", *Macromolecules,* 43, 5163-5176, 2010]. However, since prior art network PIMs are not soluble, they can only be incorporated into a membrane if mixed as fillers with microporous soluble materials, which include soluble PIMs or other soluble polymers. There is a strict requirement in non-network PIMs that there are no single bonds in the polymer backbone, to prevent rotational freedom and so provide intrinsic microporosity. Highly rigid and contorted molecular structures are required, providing awkward macromolecular shapes that cannot pack efficiently in space.

Molecules with awkward shapes are those that pose packing problems due to their concavities. However, in order to have microporosity in non-network PIMs, concave shape molecules are not sufficient as the voids must be sufficiently interconnected for transport to occur with minimal energy (i.e. intrinsic microporosity) [N B McKewon, P M Budd, "*Explotation of Intrinsic Microporosity in Polymer-Based materials*", *Macromolecules,* 43, 5163-5176, 2010]. Non-network PIMs may be soluble, and so suitable for casting a membrane by phase inversion, or for use coating a support membrane to make a thin film composite. However, their solubility in a range of solvents restricts their applications in organic solvent nanofiltration [Ulbricht M, Advanced functional polymer membranes. *Single Chain Polymers,* 47, 2217-2262, 2006].

U.S. Pat. No. 7,690,514 B2 describes materials of intrinsic microporosity comprising organic macromolecules comprised of a first generally planar species connected by linkers having a point of contortion such that two adjacent first planar species connected by a linker are held in non-coplanar orientation. Preferred points of contortion are spiro groups, bridged ring moieties and sterically congested bonds around which there is restricted rotation. These non-network PIMs may be soluble in common organic solvents, allowing them to be cast into membranes, or coated onto other support membranes to make a thin film composite.

PIM-1 (soluble PIM) membranes exhibit gas permeabilities which are exceeded only by very high free volume polymers such as Teflon AF2400 and PTMSP, presenting selectivities above Robenson's 1991 upper bound for gas pairs such as $CO_2/CH_4$ and $O_2/N_2$. Studies have shown that permeability is enhanced by methanol treatment, helping flush out residual casting solvent and allowing relaxation of the chains [P M Budd and N B McKewon, D Fritsch, "*Polymers of Intrinsic Microporosity (PIMs): High free volume polymers for membrane applications*", *Macromol Symp,* 245-246, 403-405, 2006].

A range of polyimides with characteristics similar to a polymer of intrinsic microporosity (PIM) were prepared by Ghanem et al. and membrane gas permeation experiments showed these PIM-Polyimides to be among the most permeable of all polyimides and to have selectivities close to the upper bound for several important gas pairs [B G Ghanem, N B McKewon, P M Budd, N M Al-Harbi, D Fritsch, K Heinrich, L Starannikova, A Tokarev and Y Yampolskii, "*Synthesis, characterization, and gas permeation properties of a novel group of polymers with intrinsic micro porosity: PIM-polyimides*", *Macromolecules,* 42, 7781-7888, 2009].

U.S. Pat. No. 7,410,525 B1, describes polymer/polymer mixed matrix membranes incorporating soluble polymers of intrinsic microporosity as microporous fillers for use in gas separation applications.

International Patent Publication No. WO 2005/113121 (PCT/GB2005/002028) describes the formation of thin film composite membranes from PIMs by coating a solution of PIMs in organic solvent onto a support membrane, and then optionally crosslinking this PIM film to enhance its stability in organic solvents.

In order to improve the stability of soluble-PIMs membranes U.S. Pat. No. 7,758,751 B1, describes high performance UV-crosslinked membranes from polymers of intrinsic microporosity (PIMs) and their use in both gas separations, and liquid separations involving organic solvents such as olefin/paraffin, deep desulfurization of gasoline and diesel fuels, and ethanol/water separations.

Organic Solvent Nanofiltration (OSN) has many potential applications in manufacturing industries including solvent exchange, catalyst recovery and recycling, purifications, and concentrations. U.S. Pat. Nos. 5,174,899; 5,215,667; 5,288, 818; 5,298,669 and 5,395,979 disclose the separation of organometallic compounds and/or metal carbonyls from their solutions in organic media. UK Patent No. GB 2,373, 743 describes the application of OSN to solvent exchange; UK Patent No. GB 2,369,311 describes the application of OSN to recycle of phase transfer agents, and; European Patent Application EP1590361 describes the application of OSN to the separation of synthons during oligonucleotide synthesis.

Membranes for reverse osmosis and nanofiltration can be made by the interfacial polymerisation (IP) technique. In the IP technique, an aqueous solution of a first reactive monomer (often a polyamine) is first deposited within the porous structure of a support membrane, often a polysulfone ultrafiltration membrane. Then, the polysulfone support membrane loaded with the reactive monomer solution is immersed in a water-immiscible solvent solution containing a second reactive monomer, such as triacid chloride in hexane. The first and second reactive monomers react at the interface of the two immiscible solutions, until a thin film presents a diffusion barrier and the reaction is completed to form a highly cross-linked thin film layer that remains attached to the support membrane. The thin film layer can be from several tens of nanometers to several micrometers thick. The IP technique is well known to those skilled in the art [Petersen, R. J. "*Composite reverse osmosis and nanofiltration membranes*". *J. Membr. Sci,* 83, 81-150, 1993]. The thin film is selective between molecules, and this selective layer can be optimized for solute rejection and solvent flux by controlling the reaction conditions, characteristics of the reactive monomers, solvents chosen and post-reaction treatments. The porous support membrane can be selectively chosen for porosity, strength and solvent stability. A particularly preferred class of thin film materials for nanofiltration are polyamides formed by interfacial polymerization. Examples of such polyamide thin films are found in U.S. Pat. Nos. 5,582,725, 4,876,009, 4,853,122, 4,259,183, 4,529,646, 4,277,344 and 4,039,440, the pertinent disclosures of which are incorporated herein by reference.

U.S. Pat. No. 4,277,344 describes an aromatic polyamide membrane produced by the interfacial polymerization of an aromatic polyamine with at least two primary amine substituents and an acyl halide having at least three acyl halide substituents. Wherein, the aqueous solution contains a monomeric aromatic polyamine reactant and the organic solution contains an amine-reactive polyfunctional acyl halide. The polyamide layer of TFC membranes is typically obtained via an interfacial polymerization between a piperazine or an amine substituted piperidine or cyclohexane, and a polyfunctional acyl halide as described in U.S. Pat. Nos. 4,769,148 and 4,859,384. A way of modifying reverse osmosis (herein also referred to as RO) TFC membranes for nanofiltration is described in U.S. Pat. Nos. 4,765,897; 4,812,270; and 4,824,574. Post-interfacial polymerization treatments have also been used to increase the pore size of TFC RO membranes. U.S. Pat. No. 5,246,587 describes an aromatic polyamide RO membrane that is made by first coating a porous support material with an aqueous solution containing a polyamine reactant and an amine salt. Examples of suitable polyamine reactants provided include aromatic primary diamines (such as, m-phenylenediamine or p-phenylenediamine or substituted derivatives thereof, wherein the substituent is an alkyl group, an alkoxy group, a hydroxy alkyl group, a hydroxy group or a halogen atom; aromatic secondary diamines (such as, N,N-diphenylethylene diamine), cycloaliphatic primary diamines (such as cyclohexane diamine), cycloaliphatic secondary diamines (such as, piperazine or trimethylene dipiperidine); and xylene diamines (such as m-xylene diamine).

In another method described in U.S. Pat. No. 6,245,234, a TFC polyamide membrane is made by first coating a porous polysulfone support with an aqueous solution containing: 1) a polyfunctional primary or secondary amine; 2) a polyfunctional tertiary amine; and; 3) a polar solvent. The excess aqueous solution is removed and the coated support is then dipped in an organic solvent solution of trimesoyl chloride (TMC) and a mixture of alkanes having from eight to twelve carbon atoms.

Many different types of polymers may be interfacially synthesized using interfacial polymerization. Polymers typically used in interfacial polymerization applications include, but are not limited to, polyamides, polyurea, polypyrrolidines, polyesters, poly(ester amides), polyurethanes, polysiloxanes, poly(amide imides), polyimides, poly(ether amides), polyethers, poly(urea amides) (PUA) [Petersen, R. J. "*Composite reverse osmosis and nanofiltration membranes*". *J. Membr. Sci*, 83, 81-150, 1993]. For example, U.S. Pat. No. 5,290,452 describes the formation of a cross-linked polyesteramide TFC membrane produced via interfacial polymerization. The membrane is made by reacting a dianhydride (or its corresponding diacid-diester) with a polyester diol to produce an end-capped prepolymer. The resulting end-capped prepolymer is then reacted with excess thionyl chloride to convert all unreacted anhydride and all carboxylic-acid groups into acid chloride groups. The resulting acid-chloride derivative is dissolved in organic solvent and interfacially reacted with a diamine dissolved in an aqueous phase.

In order to improve the stability of TFC prepared by interfacial polymerisation, poly(esteramide) based TFC membranes have been developed showing improved oxidative (chlorine) resistance compared to polyamide membranes [M. M. Jayaraniand S. S. Kulkarni, "*Thin-film composite poly(esteramide)-based membranes*", *Desalination*, 130, 17-30, 2000]. It has been reported that the rejection of polyesteramide TFC membranes can be tailored by varying the ester/amide ratio; more open TFC membranes were prepared using bisphenols with bulky substituents for diafiltration to separate organic molecules (MW>400 Da) from salts [Uday Razadan and S. S. Kulkarni, "*Nanofiltration thin-film composite polyesteramide membranes based on bulky diols*", *Desalination*, 161, 25-32, 2004].

U.S. Pat. No. 5,593,588 describes a thin film composite reverse osmosis membrane having an active layer of aromatic polyester or copolymer of aromatic polyester and aromatic polyamide, which has improved chlorine-resistance and oxidation stability. The active layer is prepared by the interfacial polymerization of an aqueous solution of polyhydric phenol and a solution of aromatic acyl halide dissolved in organic solvent. Spiral-wound poly(ether/amide) thin film composite membranes designated PA-300, have been previously reported for water desalination applications. PA-300 was formed by an in situ interfacial polymerization of an aqueous solution of epichlorohydrin-ethylene diamine and an organic solution of isophthalyldichloride [R L Riley, R L Fox, C R Lyons, C E Milstead, M W Seroy, and M Tagami, "*Spiral-wound poly(ether/amide) Thin-Film composite membrane systems*", *Desalination*, 19, 113-126, 1976].

The support membranes generally used for commercial TFC membranes made by interfacial polymerisation are often polysulfone or polyethersulfone ultrafiltration membranes. These supports have limited stability for organic solvents and, therefore, thin film composite membranes of the prior art which are fabricated with such supports cannot be effectively utilized for all organic solvent nanofiltration applications.

Although interfacially polymerized TFC membranes of the prior art have been specifically designed to separate aqueous feed streams down to a molecular level, they can be applied in certain organic solvents as well [Koseoglu, S. S., Lawhon, J. T. & Lusas, E. W. "*Membrane processing of crude vegetable oils pilot plant scale removal of solvent from oil miscellas*", *J. Am. Oil Chem. Soc.* 67, 315-322, 1990, U.S. Pat. No. 5,274,047]. Their effectiveness depends on the specific molecular structure of the thin film layer and the stability of the support membrane. U.S. Pat. No. 5,173,191, suggests nylon, cellulose, polyester, Teflon and polypropylene as organic solvent resistant supports. U.S. Pat. No. 6,986,844 proposes the use of crosslinked polybenzimidazole for making suitable support membranes for TFC. TFC membranes comprising a thin film synthesized from piperazine/m-phenylenediamine and trimesoyl chloride on a PAN support membrane performed well in methanol, ethanol and acetone, less well in i-propanol and MEK, and gave no flux in hexane [Kim, I.-C., Jegal, J. & Lee, K.-H. "*Effect of aqueous and organic solutions on the performance of polyamide thin-film-composite nanofiltration membranes.*" *Journal of Polymer Science Part B: Polymer Physics* 40, 2151-2163, 2002].

US 2008/0197070 describes the formation of thin film composite membranes on polyolefin (e.g. polypropylene) supports prepared by interfacial polymerization. These membranes performed well in water, ethanol and methanol.

Non-reactive polydimethylsiloxane (PDMS) has been added during the interfacial polymerization reaction using polyacrylonitrile (PAN) as the support membrane [Kim, I. C. & Lee, K. H. "*Preparation of interfacially synthesized and silicone-coated composite polyamide nanofiltration membranes with high performance.*" *Ind. Eng. Chem. Res.* 41, 5523-5528, 2002, U.S. Pat. No. 6,887,380, U.S. Pat. Applic No. 0098274 2003]. The resulting silicone-blended PA membrane showed high hexane permeabilities.

TFC membranes have also been applied for filtration in apolar solvents. A method for the separation of lube oil from organic solvents (e.g. furfural, MEK/toluene, etc.) with a TFC membrane using poly(ethylene imine) and a diisocyanate on a solvent resistant nylon 6,6 support has been described in U.S. Pat. No. 5,173,911.

In interfacially polymerized composite membranes, both the surface chemistry and the morphology of the support membrane play a crucial role in determining the overall composite membrane performance. Membrane performance can be enhanced through modification of the membrane surface [D. S. Wavhal, E. R. Fisher, "*Membrane surface modification by plasma-induced polymerization of acrylamide for improved surface properties and reduced protein fouling*", *Langmuir* 19, 79, 2003]. Thus, different procedures have been carried out to chemically modify the membrane surface and modify its properties. These procedures may increase the hydrophilicity, improve selectivity and flux, adjust transport properties, and enhance resistance to fouling and chlorine. Many methods have been reported for membrane surface modification such as grafting, coating [U.S. Pat. No. 5,234,598, 5,358,745, 6,837,381] and blending of hydrophilic/-phobic surface modifying macromolecules (SMMs) [B. J. Abu Tarboush, D. Rana, T. Matsuura, H. A. Arafat, R. M. Narbaitz, "*Preparation of thin-film-composite polyamide membranes for desalination using novel hydrophilic surface modifying macromolecules*", *J. Membr. Sci.* 325, 166, 2008].

In order to improve the performance of TFC membranes, different constituents have been added to the amine and/or acyl halide solutions. For example, U.S. Pat. No. 4,950,404, describes a method for increasing flux of a TFC membrane by adding a polar aprotic solvent and an optional acid acceptor to the aqueous amine solution prior to the interfacial polymerization reaction. In a similar way, U.S. Pat. Nos. 5,989,426; 6,024,873; 5,843,351; 5,614,099; 5,733,602 and 5,576,057 describe the addition of selected alcohols, ketones, ethers, esters, halogenated hydrocarbons, nitrogen-containing compounds and sulfur-containing compounds to the aqueous amine solution and/or organic acid halide solution prior to the interfacial polymerization reaction.

It has been claimed that soaking freshly prepared TFC membranes in solutions containing various organic species, including glycerol, sodium lauryl sulfate, and the salt of triethylamine with camphorsulfonic acid can increase the water flux in RO applications by 30-70% [M. A. Kuehne, R. Q. Song, N. N. Li, R. J. Petersen, "*Flux enhancement in TFC RO membranes*", *Environ. Prog.* 20 (1), 23, 2001]. As described in U.S. Pat. Nos. 5,234,598 and 5,358,745, TFC membrane physical properties (abrasion resistance), and flux stability can also be improved by applying an aqueous solution composed of poly(vinyl alcohol) (PVA) and a buffer solution as a post formation step during membrane preparation. Adding alcohols, ethers, sulfur-containing compounds, monohydric aromatic compounds and more specifically dimethyl sulfoxide (DMSO) in the aqueous phase can produce TFC membranes with an excellent performance [S.-Y. Kwak, S. G. Jung, S. H. Kim, "*Structure-motion-performance relationship of flux-enhanced reverse osmosis (RO) membranes composed of aromatic polyamide thin films*", *Environ. Sci. Technol.* 35, 4334, 2001; U.S. Pat. No. 5,576,057; 5,614,099]. After addition of DMSO to the interfacial polymerization system, TFC membranes with water flux five times greater than the normal TFC water flux with a small loss in rejection were obtained [S. H. Kim, S.-Y. Kwak, T. Suzuki, "*Positron annihilation spectroscopic evidence to demonstrate the flux-enhancement mechanism in morphology-controlled thin-film-composite (TFC) membrane*", *Environ. Sci. Technol.* 39, 1764, 2005].

However, in these prior art TFC membranes the use of a polysulfone support membrane limits the potential for additives to either aqueous amine solution or organic acid halide solution.

Several methods for improving TFC membrane performance post-formation are also known. For example, U.S. Pat. No. 5,876,602 describes treating the TFC membrane with an aqueous chlorinating agent to improve flux, lower salt passage, and/or increase membrane stability to bases. U.S. Pat. No. 5,755,965 discloses a process wherein the surface of the TFC membrane is treated with ammonia or selected amines, e.g., 1,6, hexane diamine, cyclohexylamine and butylamine. U.S. Pat. No. 4,765,879 describes the post treatment of a membrane with a strong mineral acid followed by treatment with a rejection enhancing agent.

A method of chemical treatment is claimed to be able to cause a simultaneous improvement of water flux and salt rejection of thin-film composite (TFC) membranes for reverse osmosis [Debabrata Mukherjee, Ashish Kulkarni, William N. Gill, "*Chemical treatment for improved performance of reverse osmosis membranes*", *Desalination* 104, 239-249, 1996]. Hydrophilization by treating the membrane surface with water soluble solvent (acids, alcohols, and mixtures of acids, alcohols and water) is a known surface modification technique. This method increases the flux without changing the chemical structure [Kulkarni, D. Mukherjee, W. N. Gill, "*Flux enhancement by hydrophilization of thin film composite reverse osmosis membranes*", *J. Membr. Sci.* 114, 39, 1996]. Using a mixture of acid and alcohol in water for the surface treatment can improve the surface properties, since acid and alcohol in water cause partial hydrolysis and skin modification, which produces a membrane with a higher flux and a higher rejection. It was suggested that the presence of hydrogen bonding on the membrane surface encourages the acid and water to react on these sites producing more charges [D. Mukherjee, A. Kulkarni, W. N. Gill, "*Flux enhancement of reverse osmosis membranes by chemical surface modification*", *J. Membr. Sci.* 97, 231, 1994]. Kulkarni et al. hydrophilized a TFC—RO membrane by using ethanol, 2-propanol, hydrofluoric acid and hydrochloric acid. They found that there was an increase in hydrophilicity, which led to a remarkable increase in water flux with no loss in rejection.

A hydrophilic, charged TFC can be achieved by using radical grafting of two monomers, methacrylic acid and poly(ethylene glycol) methacrylate onto a commercial PA-TFC—RO membrane [S. Belfer, Y. Purinson, R. Fainshtein, Y. Radchenko, O. Kedem, "*Surface modification of commercial composite polyamide reverse osmosis membranes*", *J. Membr. Sci.* 139, 175, 1998]. It was found that the use of amine containing ethylene glycol blocks enhanced the performance of the membrane, and highly improved membrane water permeability by increasing hydrophilicity [M. Sforga, S. P. Nunes, K.-V. Peinemann, "*Composite nanofiltration membranes prepared by in-situ polycondensation of amines in a poly(ethylene oxide-b-amide) layer*", *J. Membr. Sci.* 135, 179, 1997]. Poly(ethylene glycol) (PEG) and its derivatives have been used for surface modification. TFC membrane resistance to fouling could be improved by grafting PEG chains onto the TFC—RO membranes [G. Kang, M. Liu, B. Lin, Y. Cao, Q. Yuan, "*A novel method of surface modification on thin-film composite reverse osmosis membrane by grafting poly(ethylene glycol)*", *Polymer* 48, 1165, 2007, V. Freger, J. Gilron, S. Belfer, "*TFC polyamide membranes modified by grafting of hydrophilic polymers: an FT-IR/AFM/TEM study*", *J. Membr. Sci.* 209, 283, 2002].

PEG has also been used to improve the TFC membrane formation [Shih-Hsiung Chen, Dong-Jang Chang, Rey-May Liou, Ching-Shan Hsu, Shiow-Shyung Lin, "*Preparation and Separation Properties of Polyamide Nanofiltration Membrane*", *J Appl Polym Sci*, 83, 1112-1118, 2002]. Because of the poor hydrophilicity of the polysulfone support membrane, poly(ethylene glycol) (PEG) was added to the aqueous solution as a wetting agent. The effect of PEG concentration on the resulting membrane performance was also studied.

It has been reported that PEG is frequently used as an additive in the polymer solution to influence the membrane structure during phase inversion [Y. Liu, G. H. Koops, H. Strathmann, "*Characterization of morphology controlled polyethersulfone hollow fiber membranes by the addition of polyethylene glycol to the dope and bore liquid solution*", *J. Membr. Sci.* 223, 187, 2003] The role of these additives is to create a spongy membrane structure by prevention of macrovoid formation and enhance pore formation during phase inversion. Other frequently used additives are: glycerol, alcohols, dialcohols, water, polyethylene oxide (PEO), LiCl and $ZnCl_2$. US patent Nos. 2008/0312349 A and 2008/

207822 A also describe the use of PEG in the polymeric dope solution during preparation of microporous support membranes.

It is generally known that heating, also known as curing, of thin film composite membranes can be required to facilitate the removal of organic solvent from nascent polyamide thin films, and to promote additional crosslinking by dehydration of unreacted amine and carboxyl groups. [Asim K. Ghosh, Byeong-Heon Jeong, Xiaofei Huang, Eric M. V. Hoek, *Impacts of reaction and curing conditions on polyamide composite reverse osmosis membrane properties*, Journal of Membrane Science 311 (2008) 34-45]. This heating or curing is usually undertaken after the interfacial polymerisation reaction, and can be in the range from 45° C. to 90° C. or higher.

The membrane products and membrane-related methods of the present invention advantageously address and/or overcome the obstacles, limitations and problems associated with current membrane technologies and effectively address membrane-related needs that are noted herein.

SUMMARY OF THE INVENTION

The present invention provides, in a first aspect, a thin film composite membrane comprising a support membrane coated with a separating layer, wherein the separating layer comprises a network polymer possessing intrinsic microporosity. The membranes of the invention are particularly suitable for gas separation, pervaporation, nanofiltration, desalination and water treatment.

Suitably, at least a proportion of the monomeric components of the network polymer possess concavity.

More particularly, the present invention relates to the production and utilization of membranes for nanofiltration operations in organic solvents.

Further, the present invention also provides thin film composite membranes formed by interfacial polymerisation. Thus, in another aspect, the present invention provides a thin film composite membrane comprising a support membrane coated with a separating layer, wherein the separating later is formed on the support layer by interfacial polymerisation, and wherein the separating layer comprises a network polymer possessing intrinsic microporosity.

In a particular embodiment, the thin film composite membranes are formed by interfacial polymerisation, wherein at least one of the monomers used in the interfacial polymerisation reaction possesses concavity.

In another aspect, the invention provides a thin film composite membrane, wherein the membrane is a composite membrane comprising a separating layer formed by interfacial polymerisation of at least one first reactive monomer and at least one second reactive monomer on a support membrane, wherein the resulting separating layer comprises a polymer network with intrinsic microporosity. The support membrane may be impregnated with a conditioning agent and may be stable in organic solvents; and wherein the composite membrane may be cured with temperature and/or treated with an activating solvent prior to use. Suitably, at least one of the reactive monomers used in the interfacial polymerisation reaction is a molecule with a concave shape (i.e. awkward or contorted) preferably rigid, restricting the freedom of the resulting network polymer to undergo structural rearrangement, giving rise to interconnected microvoids and associated intrinsic microporosity.

In an embodiment, the composite membrane may be cured with temperature for a given time to improve some properties, including, but not limited to, membrane selectivity.

In a further embodiment, the composite membrane may be treated with an activating solvent during or after interfacial polymerisation. Without wishing to be bound by any particular theory, the use of an activating solvent to treat the membrane is believed to flush out any debris, unreacted material and small oligomers from the pores of the membrane following the interfacial polymerisation reaction. The treatment of the composite membrane with an activating solvent provides a membrane with improved properties, including, but not limited to, membrane flux.

In a further aspect, the invention provides an interfacial polymerisation process for forming a thin film composite membrane as defined herein, comprising the steps of:
(a) impregnating a porous support membrane which may comprise a first conditioning agent, with a first reactive monomer solution comprising:
 (i) a first solvent for the said first reactive monomer;
 (ii) a first reactive monomer or/and a reactive monomer possessing concavity;
 (iii) optionally, an activating solvent,
 (iv) optionally, additives including alcohols, ketones, ethers, esters, halogenated hydrocarbons, nitrogen-containing compounds and sulphur-containing compounds, monohydric aromatic compounds;
(b) contacting the impregnated support membrane with a second reactive monomer solution comprising:
 (i) a second solvent for the second reactive monomer;
 (ii) a second reactive monomer or/and a reactive monomer possessing concavity;
 (iii) optionally, additives including alcohols, ketones, ethers, esters, halogenated hydrocarbons, nitrogen-containing compounds and sulphur-containing compounds, monohydric aromatic compounds;
wherein:
 the first solvent and the second solvent form a two phase system;
 at least one of the reactive monomers possesses concavity; and
 the reaction of the monomers results in a separating layer forming on the support membrane to give a composite membrane;
(c) optionally, after a reaction period, capping the unreacted groups of the separating layer with functional groups to modify the surface chemistry;
(d) after a reaction period, immersing the resulting composite membrane into a quench medium;
(e) optionally, curing the membrane with temperature or microwaves for a given time;
(f) optionally, treating the resulting composite membrane with an activating solvent; and
(g) optionally, impregnating the resulting composite membrane with a second conditioning agent.

In a further aspect the present invention provides a thin film composite membrane obtainable by any one of the methods defined herein.

In a further aspect the present invention provides a thin film composite membrane obtained by any one of the methods defined herein.

In a further aspect the present invention provides a thin film composite membrane directly obtained by any one of the methods defined herein.

TFC membranes of the invention are suitably made by interfacial polymerisation, comprising a separating layer formed of a crosslinked polymer network possessing intrinsic microporosity. The TFC membranes of the invention can be used for gas separation and/or nanofiltration operations in aqueous and/or organic solvents. In particular, they can be used for nanofiltration operations in organic solvents. An advantage of the membranes of the present invention is that a crosslinked polymer network possessing intrinsic microporosity is formed in situ during the interfacial polymerisation reaction as the separating layer, whereas prior art thin film composite membranes with polymers of intrinsic microporosity are prepared by coating and are restricted to soluble polymers of intrinsic microporosity which are non-network polymers. The use of the composite membranes of the invention in nanofiltration with polar aprotic solvents is advantageous when using a solvent stable support with respect to many of the prior art high free volume thin film composite nanofiltration membranes, which are not stable in solvents such as dimethylacetimide (DMAc), dimethylformamide (DMF), dimethylsufoxide (DMSO), tetrahydrofuran (THF), N-methyl-2-pyrrolidone (NMP), and dichloromethane (DCM) or require further crosslinking for solvent stability. Another advantage of the membranes of the present invention is their thin separating layer (thickness in the order of nanometers), with respect to many prior art high free volume thin film composite membranes and TFC's with intrinsic microporosity, which are prepared by dip coating or solvent casting and have a separating layer thickness in the order of microns. Thinner separating layers give rise to higher permeabilities and require less material in the separating layer. Yet a further advantage of the membranes of the present invention is that activating solvents may include polar aprotic solvents, and additives may include a wide range of species in which the support membrane is stable. TFC membranes of the present invention may exhibit higher permeabilities and selectivities than known membranes for gas separation and when mixtures of water and organic solvent are being processed.

BRIEF DESCRIPTION OF THE DRAWINGS

FIG. 17 shows the gas separation performance for a TFC-IP-PIMs membrane prepared on a PEEK support membrane. The membrane has been cured in an oven at 85° C. for 10 minutes. Gas permeation experiments were carried out at 40, 50 and 60 psig.

FIG. 18B shows various concavity-containing monomers.

FIG. 18C shows various concavity-containing monomers.

DESCRIPTION OF VARIOUS EMBODIMENTS

Definitions

Figure 1:
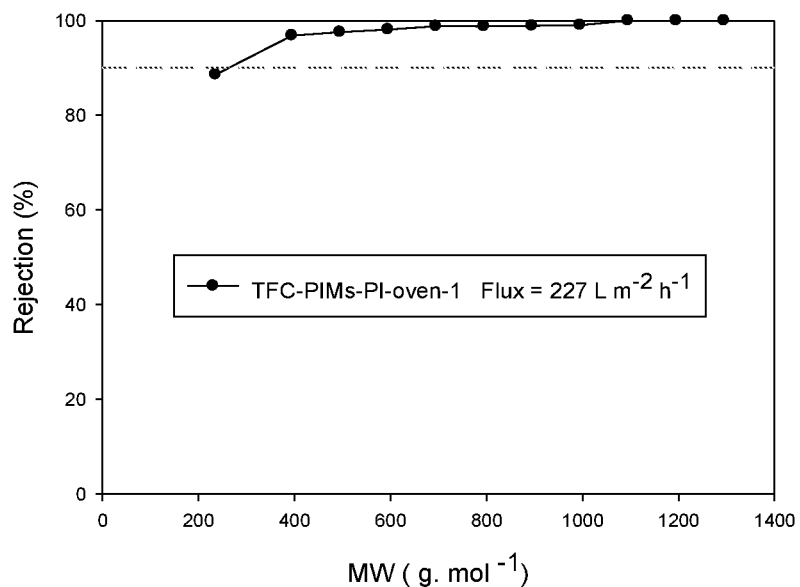
FIG. 1 shows the molecular weight cut off (MWCO) curve and flux of a TFC-IP-PIMs membrane prepared on a crosslinked P84 support. The TFC membrane has been cured in the oven at 85° C. for 10 minutes. Nanofiltration of a feed solution comprising polystyrene oligomers dissolved in acetone has been performed at 30 bar and 30° C.
Figure 2:
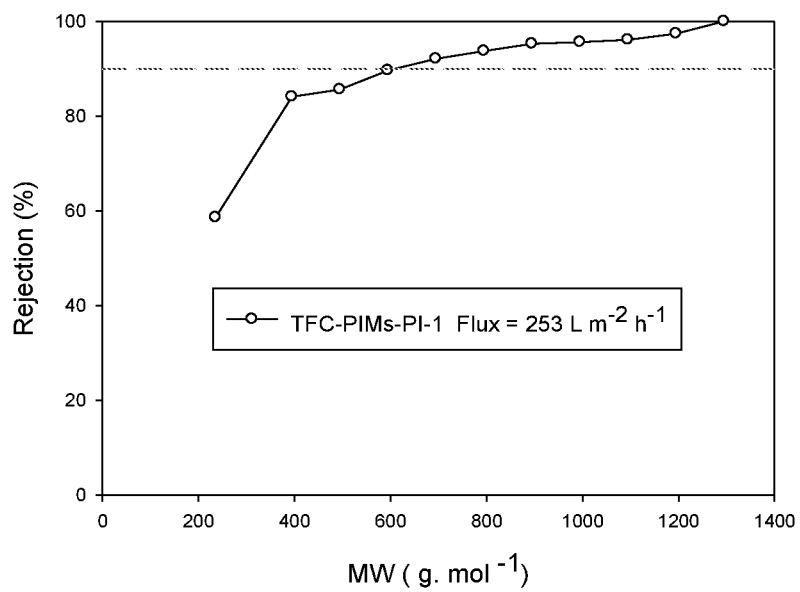
FIG. 2 shows the MWCO curve and flux of a TFC-IP-PIMs membrane prepared on a crosslinked P84 support. The TFC membrane has not been cured in the oven. Nanofiltration of a feed solution comprising polystyrene oligomers dissolved in acetone has been performed at 30 bar and 30° C.
Figure 3:
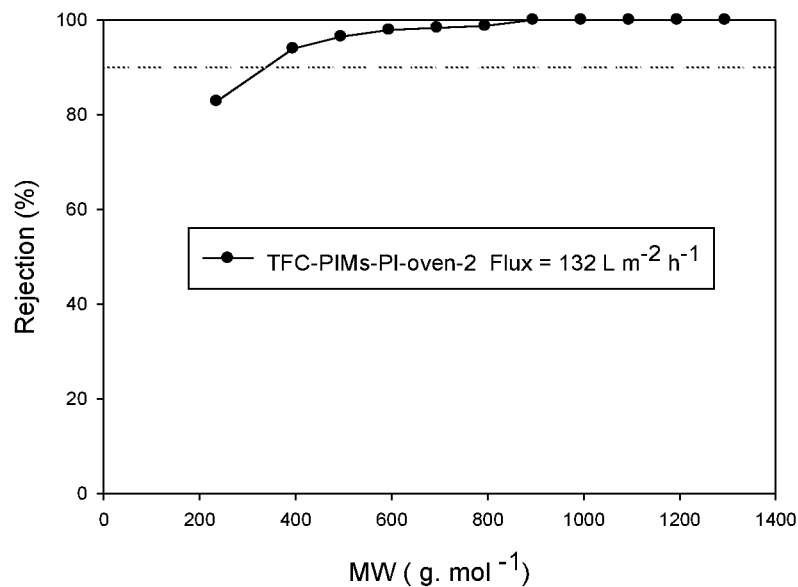
FIG. 3 shows the MWCO curve and flux of TFC-IP-PIMs membrane prepared on a crosslinked P84 support. The TFC membrane has been cured in the oven at 85° C. for 10 minutes. Nanofiltration of a feed solution comprising polystyrene oligomers dissolved in methanol has been performed at 30 bar and 30° C.
Figure 4:
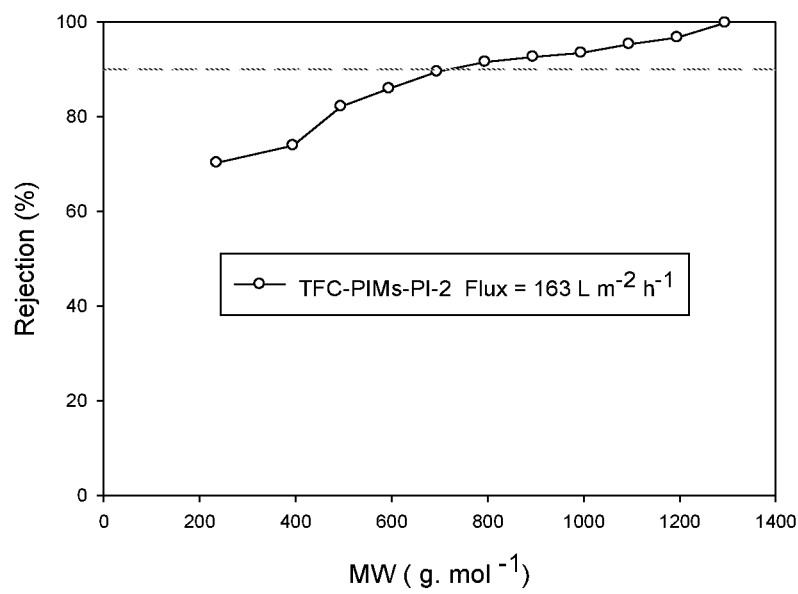
FIG. 4 shows the MWCO curve and flux of a TFC-IP-PIMs membrane prepared on a crosslinked P84 support. The TFC membrane has not been cured in the oven. Nanofiltration of a feed solution comprising polystyrene oligomers dissolved in methanol has been performed at 30 bar and 30° C.
Figure 5:
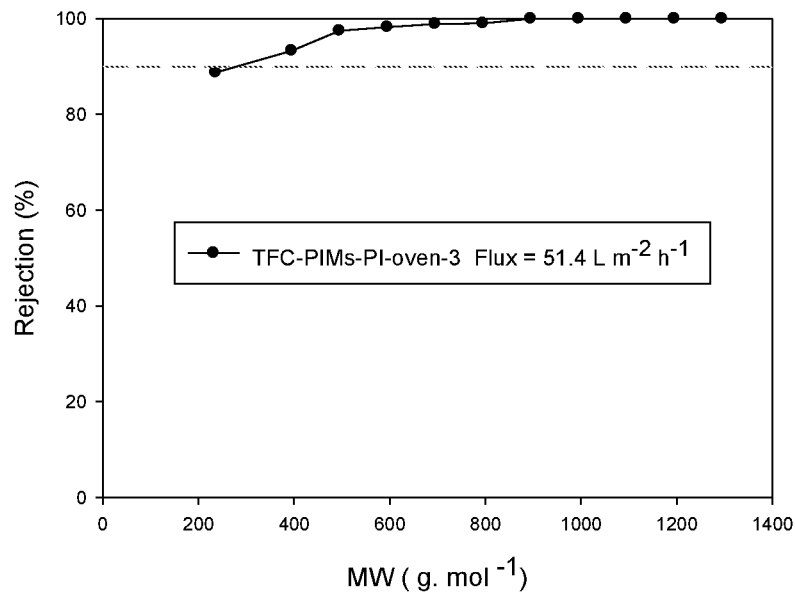
FIG. 5 shows the MWCO curve and flux of a TFC-IP-PIMs membrane prepared on a crosslinked P84 support. The TFC membrane has been cured in the oven at 85° C. for 10 minutes. Nanofiltration of a feed solution comprising polystyrene oligomers dissolved in DMF has been performed at 30 bar and 30° C.
Figure 6:
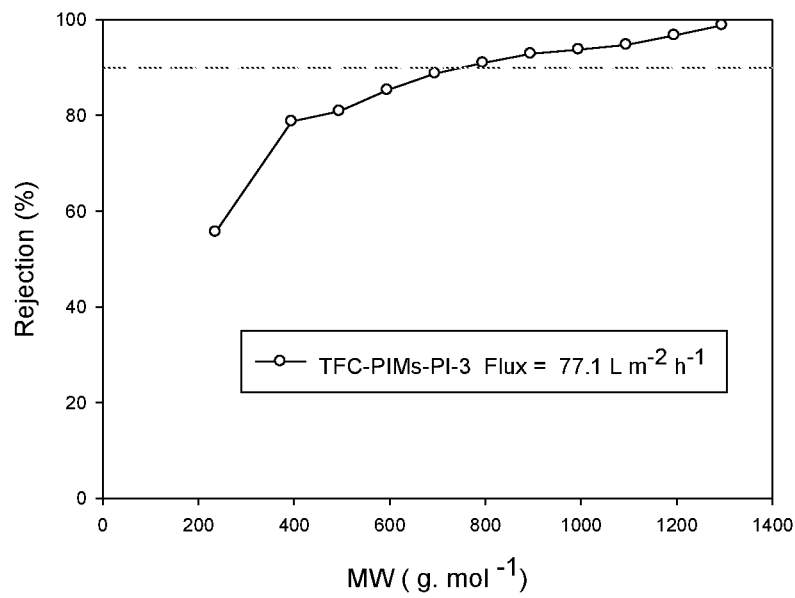
FIG. 6 shows the MWCO curve and flux of a TFC-IP-PIMs membrane prepared on a crosslinked P84 support. The TFC membrane has not been cured in the oven. Nanofiltration of a feed solution comprising polystyrene oligomers dissolved in DMF has been performed at 30 bar and 30° C.
Figure 7:
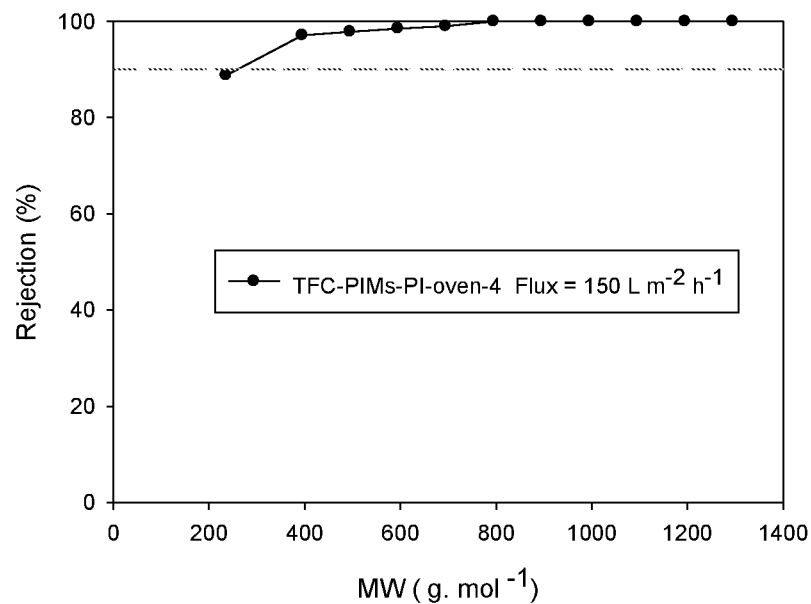
FIG. 7 shows the MWCO curve and flux of a TFC-IP-PIMs membrane prepared on a crosslinked P84 support. The TFC membrane has been cured in the oven at 85° C. for 10 minutes. Nanofiltration of a feed solution comprising polystyrene oligomers dissolved in THF has been performed at 30 bar and 30° C.
Figure 8:
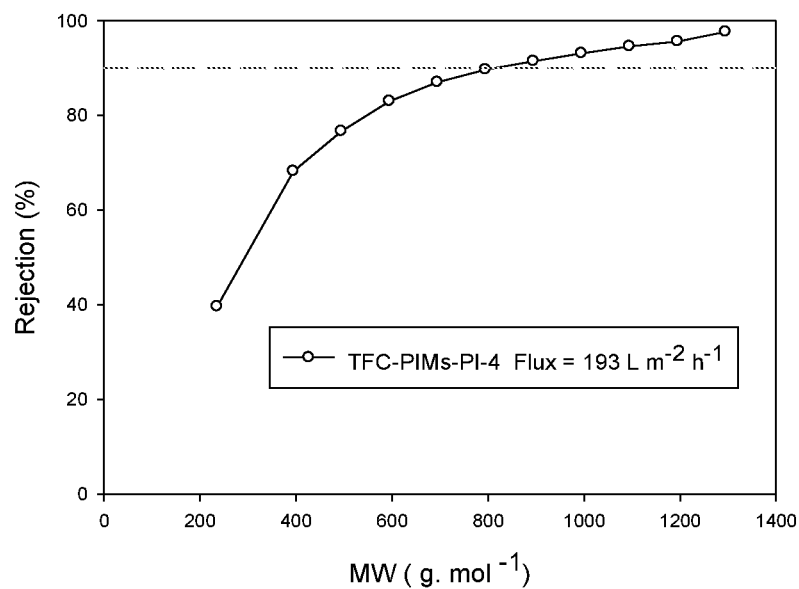
FIG. 8 shows the MWCO curve and flux of a TFC-IP-PIMs membrane prepared on a crosslinked P84 support. The TFC membrane has not been cured in the oven. Nanofiltration of a feed solution comprising polystyrene oligomers dissolved in THF has been performed at 30 bar and 30° C.
Figure 9:
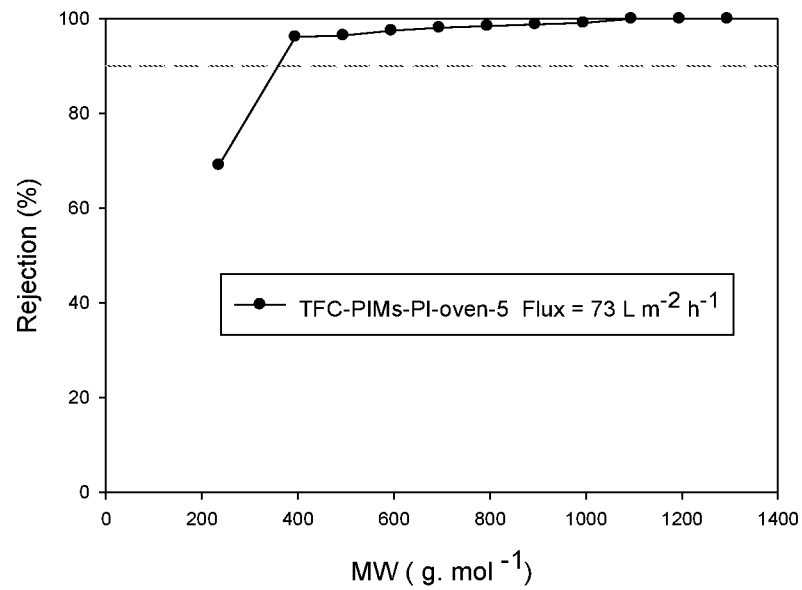
FIG. 9 shows the MWCO curve and flux of a TFC-IP-PIMs membrane prepared on a crosslinked P84 support. The TFC membrane has been cured in the oven at 85° C. for 10 minutes. Nanofiltration of a feed solution comprising polystyrene oligomers dissolved in toluene has been performed at 30 bar and 30° C.
Figure 10:
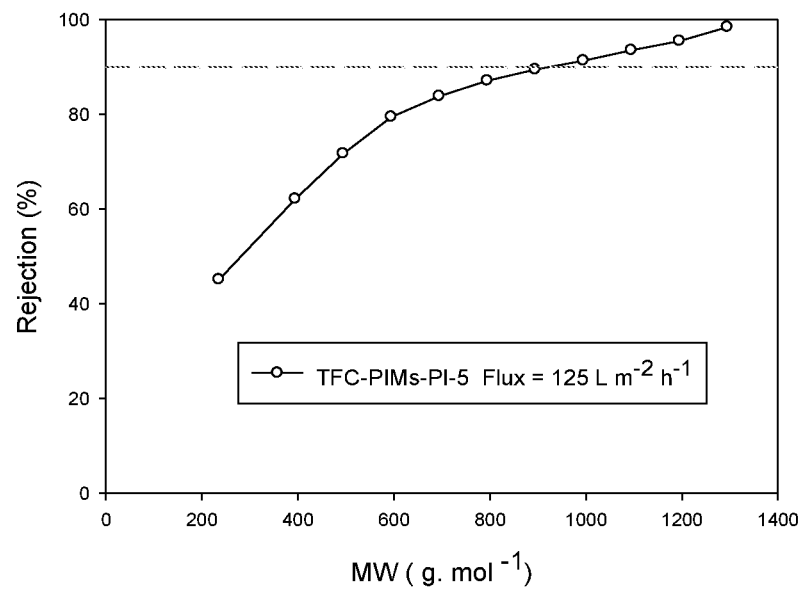
FIG. 10 shows the MWCO curve and flux of TFC-IP-PIMs membranes prepared on a crosslinked P84 support. The TFC membrane has not been cured in the oven. Nanofiltration of a feed solution comprising polystyrene oligomers dissolved in toluene has been performed at 30 bar and 30° C.
Figure 11:
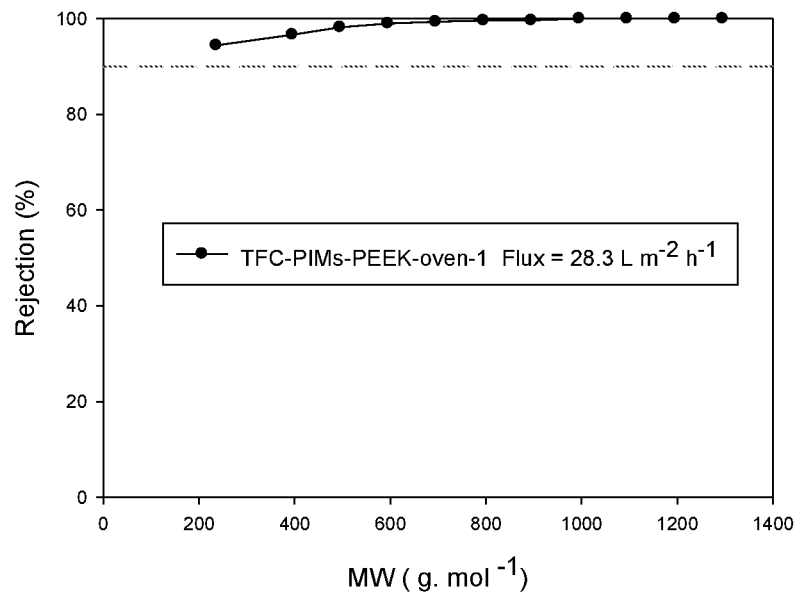
FIG. 11 shows the MWCO curve and flux for a TFC-IP-PIMs membrane prepared on a PEEK support membrane. The TFC membrane has been cured in an oven at 85° C. for 10 minutes. Nanofiltration of a feed solution comprising polystyrene oligomers dissolved in THF has been performed at 30 bar and 30° C.
Figure 12:
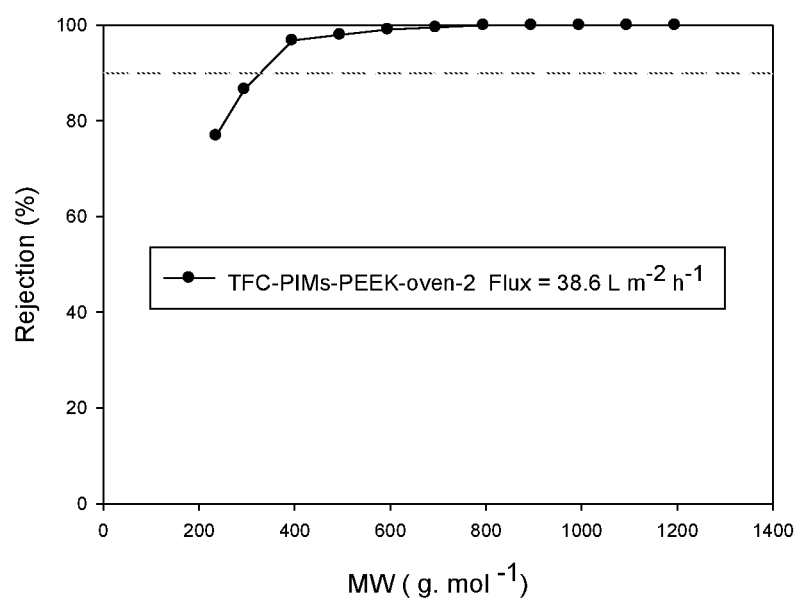
FIG. 12 shows the MWCO curve and flux for a TFC-IP-PIMs membrane prepared on a PEEK support membrane. The TFC membrane has been cured in an oven at 85° C. for 10 minutes. Nanofiltration of a feed solution comprising polystyrene oligomers dissolved in acetone has been performed at 30 bar and 30° C.
Figure 13:
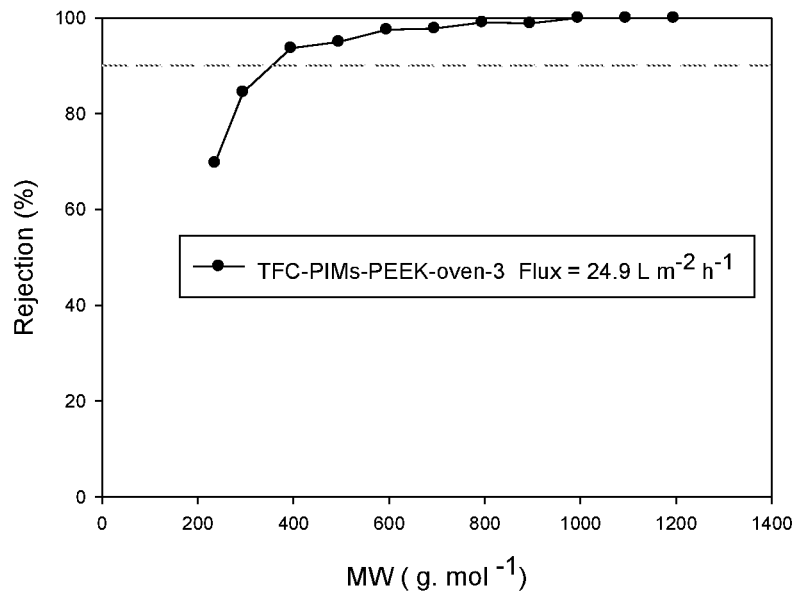
FIG. 13 shows the MWCO curve and flux for a TFC-IP-PIMs membrane prepared on a PEEK support membrane. The TFC membrane has been cured in the oven at 85° C. for 10 minutes. Nanofiltration of a feed solution comprising polystyrene oligomers dissolved in toluene has been performed at 30 bar and 30° C.
Figure 14:
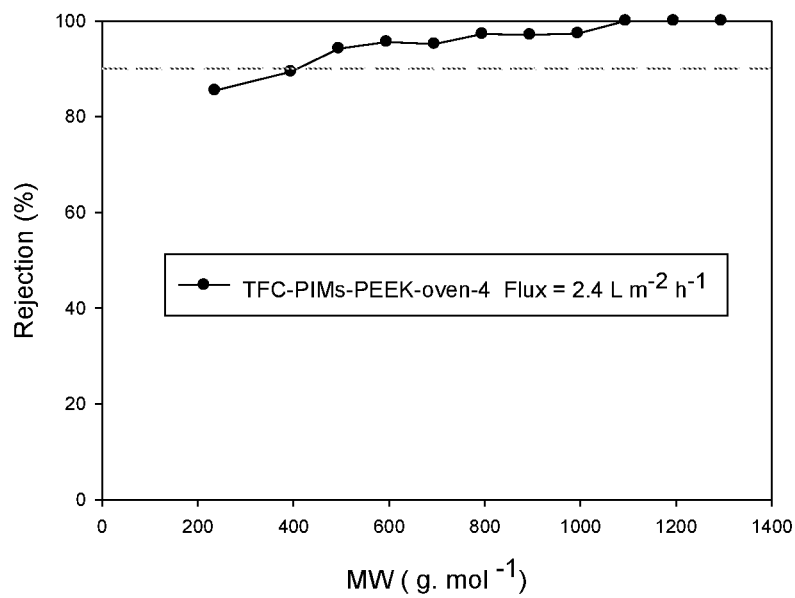
FIG. 14 shows the MWCO curve and flux for a TFC-IP-PIMs membrane prepared on a PEEK support membrane. The TFC membrane has been cured in an oven at 85° C. for 10 minutes. Nanofiltration of a feed solution comprising polystyrene oligomers dissolved in heptane has been performed at 30 bar and 30° C.

As used herein, the terms "optionally" or "optional" means that the later described event or action may or may not take place, and that the description includes examples where said event or action takes place and examples where it does not.

The term "network polymer" is used herein to refer to a covalently cross-linked 3-dimensional polymeric network. This is in contrast to a "non-network polymer" (or a "linear" polymer) in which the polymers do not have a covalently cross-linked 3-dimensional structure.

The term "microporosity" is used herein to refer to separating layer of the membrane comprising pores of less than or equal to 2 nm in size.

The term "intrinsic microporosity" is used herein to mean the network polymer provides a continuous network of interconnected intermolecular voids (suitably of less than or equal to 2 nM in size), which forms as a direct consequence of the shape and rigidity (or concavity) of at least a proportion of the component monomers of the network polymer. As will be appreciated by a person skilled in the art, intrinsic microporosity arises due to the structure of the monomers used to form the network polymer and, as the term suggests, it is an intrinsic property of a network polymer formed from such monomers. The shape and rigidity of the monomer used to form the network polymer means that polymer possesses an internal molecular free volume (IMFV), which is a measure of the concavity of the monomers and is the difference between the volume of the concave monomer unity compared to that of the corresponding planar shape.

It is understood that the network polymers disclosed herein have a certain property (i.e. intrinsic microporosity). Disclosed herein are certain structural requirements in the monomers used for giving a polymer performing the disclosed function, and it is understood that there are a variety of structures that can perform the same function that are related to the disclosed monomer structures, and that these structures will typically achieve the same result.

Disclosed are the monomers to be used to prepare the network polymers of the invention as well as the polymers themselves to be used within the methods disclosed herein. It is understood that when combinations, subsets, etc. of these monomers are disclosed, that while specific reference of each various individual and collective combinations and permutation of these monomers may not be explicitly disclosed, each is specifically contemplated and described herein. If a particular polymer is disclosed and discussed and a number of modifications that can be made to a number of monomers are discussed, specifically contemplated is each and every combination and permutation of the monomers and the modifications that are possible unless specifically indicated to the contrary. Thus, if a class of monomers A, B, and C are disclosed, as well as a class of monomers D, E and F and an example of a combination polymer A-D is disclosed, then even if each is not individually recited each is individually and collectively contemplated meaning combinations A-E, A-F, B-D, B-E, B-F, C-D, C-E and C-F are considered disclosed. Likewise any subset or combination of these is also disclosed. Thus, for example, the sub-group of A-E, B-F, and C-E would be considered disclosed. This concept applies to all aspects of this application including, but not limited to, steps in methods of making and using compositions of the invention.

By the term "nanofiltration" it is meant a membrane process which will allow the passage of solvents while retarding the passage of larger solute molecules, when a pressure gradient is applied across the membrane. This may be defined in terms of membrane rejection $R_i$, a common measure known by those skilled in the art and defined as:

$$R_i = \left(1 - \frac{C_{Pi}}{C_{Ri}}\right) \times 100\% \quad (1)$$

where $C_{P,i}$=concentration of species i in the permeate, permeate being the liquid which has passed through the membrane, and $C_{R,i}$=concentration of species i in the retentate, retentate being the liquid which has not passed through the membrane. It will be appreciated that a membrane is selectively permeable for a species if $R_i>0$. It is well understood by those skilled in the art that nanofiltration is a process in which at least one solute molecule i with a molecular weight in the range 100-2,000 g mol$^{-1}$ is retained at the surface of the membrane over at least one solvent, so that $R_i>0$. Typical applied pressures in nanofiltration range from 5 bar to 50 bar.

The term "solvent" will be well understood by the average skilled reader and includes an organic or aqueous liquid with molecular weight less than 300 Daltons. It is understood that the term solvent also includes a mixture of solvents.

By way of non-limiting example, solvents include aromatics, alkanes, ketones, glycols, chlorinated solvents, esters, ethers, amines, nitriles, aldehydes, phenols, amides, carboxylic acids, alcohols, furans, and polar protic and polar aprotic solvents, water, and mixtures thereof.

By way of non-limiting example, specific examples of solvents include toluene, xylene, benzene, styrene, anisole, chlorobenzene, dichlorobenzene, chloroform, dichloromethane, dichloroethane, methyl acetate, ethyl acetate, butyl acetate, methyl ether ketone (MEK), methyl iso butyl ketone (MIBK), acetone, ethylene glycols, ethanol, methanol, propanol, butanol, hexane, cyclohexane, dimethoxyethane, methyl tert butyl ether (MTBE), diethyl ether, adiponitrile, N,N dimethylformamide, dimethylsulfoxide, N,N dimethylacetamide, dioxane, nitromethane, nitrobenzene, pyridine, carbon disulfide, tetrahydrofuran, methyltetrahydrofuran, N-methylpyrrolidone, acetonitrile, water, and mixtures thereof.

The term "solute" will be well understood by the average skilled reader and includes an organic molecule present in a liquid solution comprising a solvent and at least one solute molecule such that the weight fraction of the solute in the liquid is less than the weight fraction of the solvent, and where the molecular weight of the solute is at least 20 g mol$^{-1}$ higher than that of the solvent.

Thin Film Composite Membranes

Thin film composite (also referred to as TFC) membranes will be familiar to one of skill in this art and include an entity composed of a thin film separating layer over a support membrane, where the support membrane is previously formed from a different material. TFC membranes are suitably formed by interfacial polymerisation.

Suitable support membranes can be produced from polymer materials including polysulfone, polyethersulfone, poly(ether sulfone ketone), polyacrylonitrile, polypropylene, polyamide, cellulose acetate, cellulose diacetate, cellulose triacetate, poly(ether ethyl ketone), poly(pthalazinone ether sulfone ketone), a perfluoropolymer, polyimide, polybenzimidazole, perfluoropolymers, polyether ether ketone (PEEK), sulfonated polyether ether ketone (S-PEEK), or other polymeric materials known to those skilled in the art. Wherein, the polymer support membrane may be further crosslinked.

Preferably, suitable support membranes may be prepared from an inorganic material such as by way of non-limiting example silicon carbide, silicon oxide, zirconium oxide, titanium oxide, aluminium oxides or zeolites, using any technique known to those skilled in the art such as sintering, leaching or sol-gel processes.

The polymer used to form the support membrane includes but is not limited to polyimide polymer sources. The identities of such polymers are presented in the prior art, U.S. Pat. No. 0,038,306, the entire contents of which are incorporated herein by reference. More preferably, the support membrane of the invention is prepared from a polyimide polymer described in U.S. Pat. No. 3,708,458, assigned to Upjohn, the entire contents of which are incorporated herein by reference. The polymer, available from HP polymers GmbH, Austria as P84, is a copolymer derived from the condensation of benzophenone 3,3',4-4'-tetracarboxylic acid dianhydride (BTDA) and a mixture of di(4-aminophenyl) methane and toluene diamine or the corresponding diisocyanates, 4,4'-methylenebis(phenyl isocyanate) and toluene diisocyanate.

Support membranes can be prepared following the methods described in GB 2,437,519, the entire contents of which are incorporated herein by reference, and comprise both nanofiltration and ultrafiltration membranes. More preferably, the membranes of the invention used as supports are within the ultrafiltration range. The membrane supports of the invention may be crosslinked using suitable amine crosslinking agents and the crosslinking method and time may be that described in GB 2,437,519.

The support membrane is optionally impregnated with a conditioning agent. The term "conditioning agent" is used herein to refer to any agent which, when impregnated into the support membrane prior to the interfacial polymerisation reaction, provides a resulting membrane with a higher rate of flux. Any suitable conditioning agent may be used. Suitably, the conditioning agent is a low volatility organic liquid. The conditioning agent may be chosen from synthetic oils (e.g., polyolefinic oils, silicone oils, polyalphaolefinic oils, polyisobutylene oils, synthetic wax isomerate oils, ester oils and alkyl aromatic oils), mineral oils (including solvent refined oils and hydroprocessed mineral oils and petroleum wax isomerate oils), vegetable fats and oils, higher alcohols (such as decanol, dodecanol, heptanol), glycerols, and glycols (such as polypropylene glycols, polyethylene glycols, polyalkylene glycols). Suitable solvents for dissolving the conditioning agent include water, alcohols, ketones, aromatics, hydrocarbons, or mixtures thereof. The first and second conditioning agents referred to herein may be the same or different.

In this invention, prior to the interfacial polymerization reaction, the support membrane is optionally treated with a first conditioning agent dissolved in a solvent to impregnate the support membrane. Suitably, the first conditioning agent is a low volatility organic liquid as defined above.

Following treatment with the conditioning agent, the support membrane is typically dried in air at ambient conditions to remove residual solvent.

The interfacial polymerization reaction is generally held to take place at the interface between the first reactive monomer solution, and the second reactive monomer solution, which form two phases. Each phase may include a solution of a dissolved monomer or a combination thereof. Concentrations of the dissolved monomers may vary. Variables in the system may include, but are not limited to, the nature of the solvents, the nature of the monomers, monomer concentrations, the use of additives in any of the phases, reaction temperature and reaction time. Such variables may be controlled to define the properties of the membrane, e.g., membrane selectivity, flux, separating layer thickness. At least one of the monomers used in the reactive monomer solutions should have well-defined concavity (i.e. concave shape). Monomers in the first reactive solution may include, but are not limited to, polyphenols, polyamines, or mixtures thereof. The monomers in the second reactive solution include but are not limited to polyfunctional acyl halides, polyfunctional haloalkylbenzenes, polyfunctional halogenated aromatic species, or mixtures thereof. The resulting reaction may form a network polymer separating layer on top of the support membrane, including but not limited to a network polyester layer, a network polyether layer, a network polyamide layer, or a network layer that includes mixtures of these.

Although water is a preferred solvent for the first reactive monomer solution, non-aqueous solvents may be utilized, such as acetyl nitrile and dimethylformamide (DMF). Although no specific order of addition is necessarily required, the first reactive monomer solution is typically coated on or impregnated into the support membrane first, followed by the second reactive monomer solution being brought into contact with the support membrane. Although one or both of the first monomer and the second monomer may be applied to the porous support from a solution, they may alternatively be applied by other means such as by vapour deposition, or neat.

A residue of a chemical species refers to the moiety that is the resulting product of the chemical species in a particular reaction or subsequent chemical product, regardless of whether the moiety is actually obtained from the chemical species. Thus, an ethylene glycol residue in a polyester refers to one or more —OCH$_2$CH$_2$O— units in the polyester, regardless of whether the residue is obtained by reacting ethylene glycol to obtain the polyester.

In this invention, the polymer matrix of the separating layer can comprise any three-dimensional polymer network possessing intrinsic microporosity. In one aspect, the separating layer comprises at least one of an aliphatic or aromatic polyamide, aromatic polyhydrazide, poly-benzimidazolone, polyepiamine/amide, polyepiamine/urea, poly-ethyleneimine/urea, sulfonated polyfurane, polyether, a polyether-amide, a polyether-urea, a polyester, a polyesteramide, polybenzimidazole, polypiperazine isophtalamide, or a polyimide or a copolymer thereof or a mixture thereof. The polymer selected to form the separating layer can be formed by an interfacial polymerization reaction.

It is an important feature of the present invention that at least one of the monomers participating in the interfacial polymerisation reaction is a molecule with a concave shape (i.e. concavity), preferably rigid and linked to another monomer or monomers to form a polymer network within which molecular rotation is preferably hindered. Concavity-containing monomers include but are not limited to molecules containing a spiro-contorted centre, bridged ring moieties and sterically congested single covalent bonds around which there is restricted rotation. These molecules are also known as molecules with awkward shapes (i.e. those that pose packing problems due to their concavities). Structural units with well-defined cavities include but are not limited to 1,1-spirobisindanes (e.g. 1, 3, 4-7, 19 in FIG. 18A-C), 9,9-spirobisfluorenes (e.g. 16, 20 in FIGS. 18A-C), bisnaphthalenes (e.g. 2, 17 in FIGS. 18A-C) 1,1-spirobis,2,3,4-tetrahydro-naphthalenes (e.g. 11-14 in FIGS. 18A-C), and 9,10-ethanoanthracene (e.g. 8,9 in FIGS. 18A-C). Generally, the polymer network of the invention is prepared by reaction of two or more monomers, wherein at least one of the monomers possesses concavity. In one aspect the first monomer is a dinucleophilic or polynucleophilic monomer and the second monomer is a dielectrophilic or a polyelectrophilic monomer. Wherein, each monomer can have two or more reactive groups. Both electrophiles and nucleophiles are well known in the art, and one of skill in the art can choose suitable monomers for the interfacial polymerisation reaction. The first and second monomers can be chosen so as to be able to undergo an interfacial polymerisation reaction to form a three-dimensional polymer network when brought into contact.

Figure 18A:
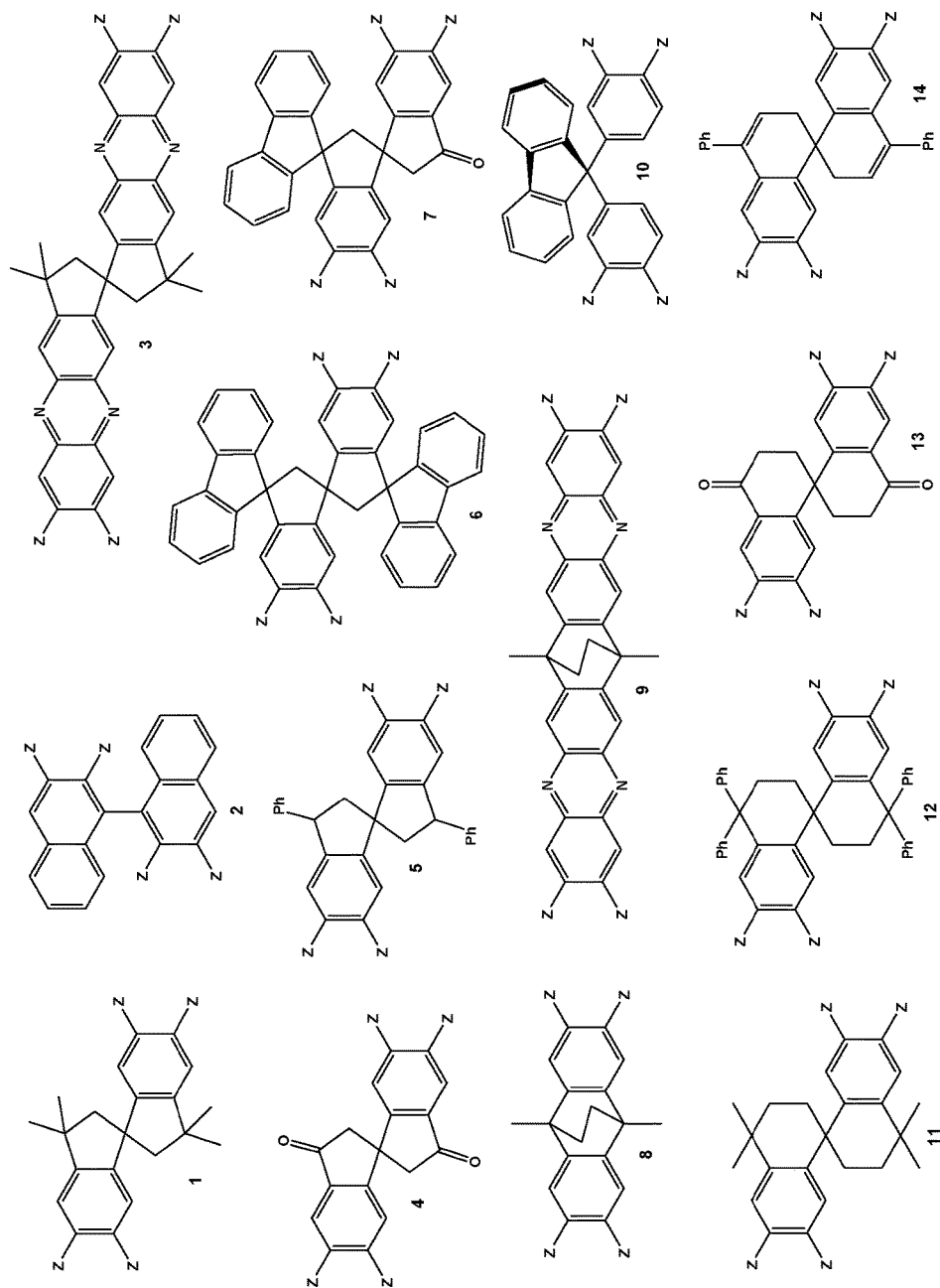
FIGS. 18A-C shows various concavity-containing monomers.
Figure 18B:
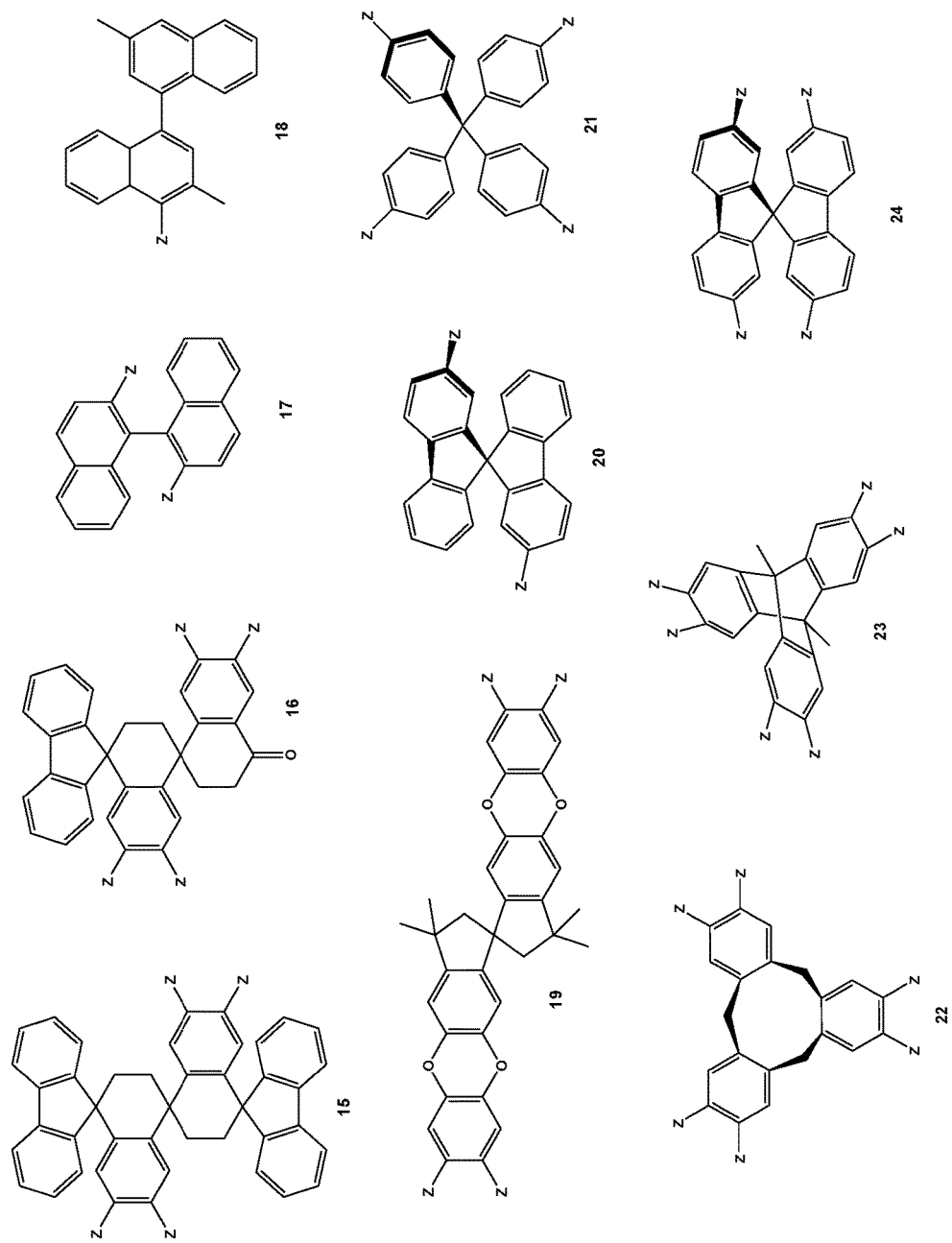
Figure 18C:
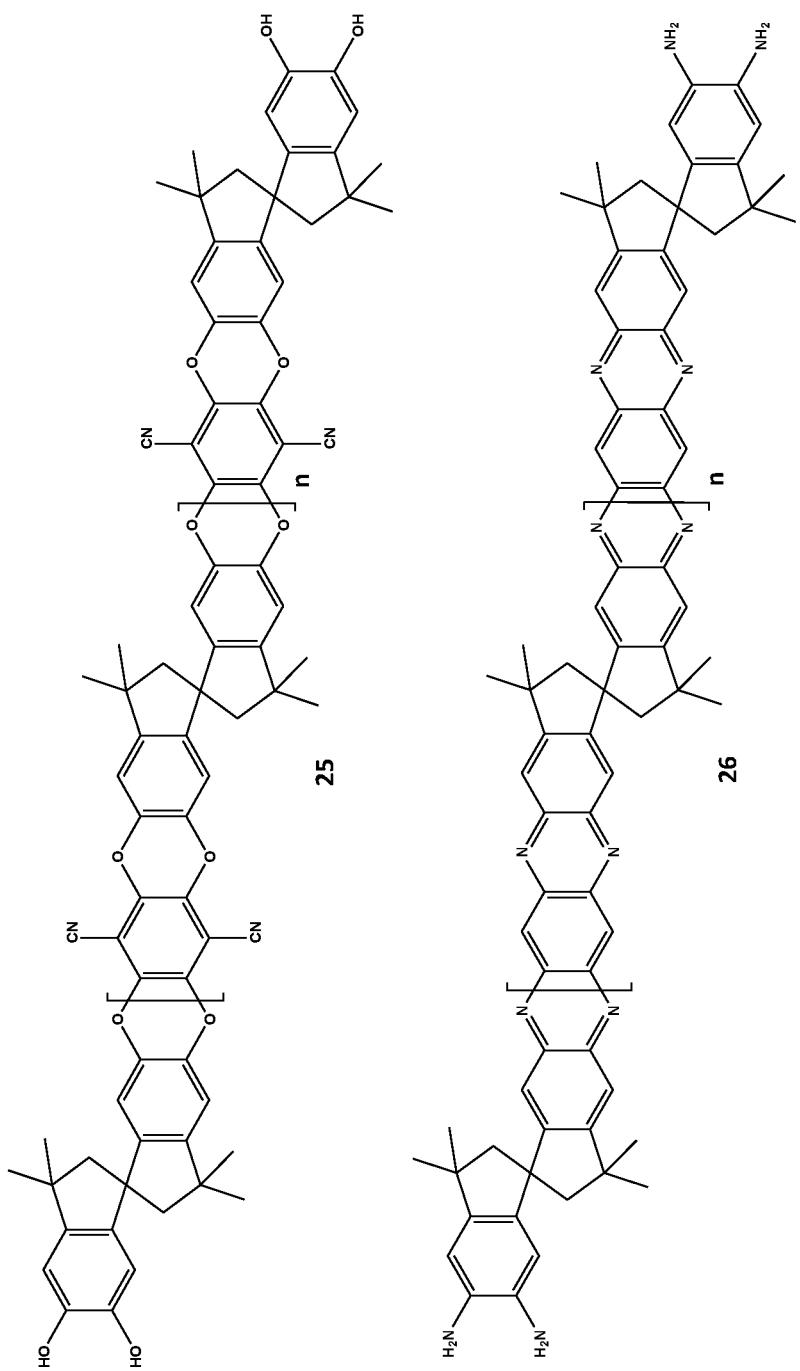
Figure 19:
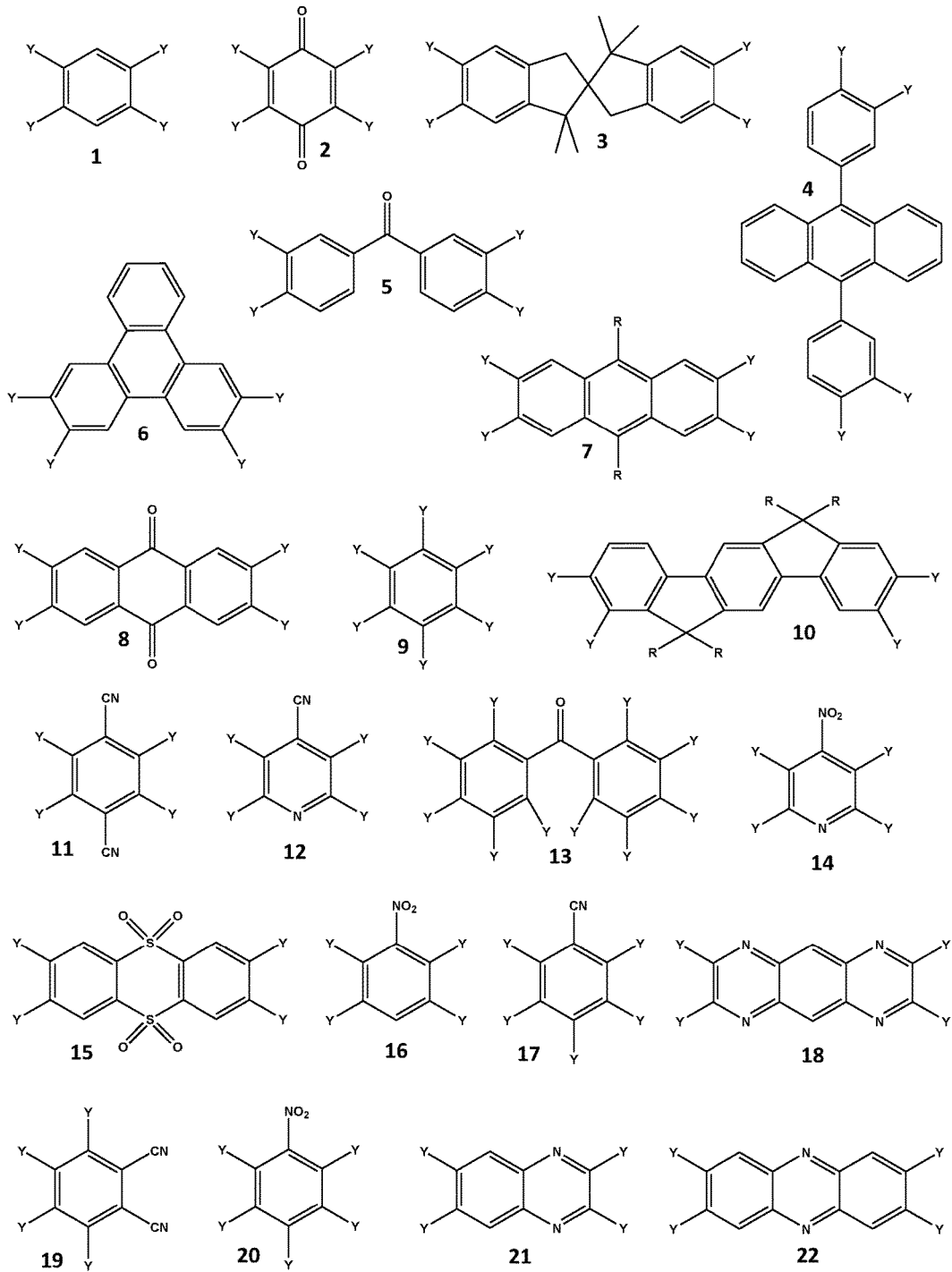
FIG. 19 shows examples of rigid monomers.

In FIGS. 18A-C, the reactive groups are shown as Z. Here Z may be any suitable nucelophilic group such as hydroxyl or amine groups, and specifically Z=—OH, —NH$_2$. Alternatively, Z may be any electrophilic group such as an acyl halide, specifically an acyl chloride, or an electron withdrawing group that renders the monomer electrophilic. Suitable electron withdrawing groups include halogenated species F, Cl, Br, or I. 3, 4, 9 and 13 in FIGS. 18A-C show monomers where Z could be a halogen. FIG. 19 shows examples of rigid monomers, which are optional monomers for the interfacial polymerization reaction. Such monomers may be used individually or as mixtures with other monomers. Reactive groups in FIG. 19 are assigned as Y. Here Y may be any suitable nucelophilic group such as hydroxyl or amine groups, and specifically Z=—OH, —NH$_2$. Alternatively, Z may be any electrophilic group such as an acyl halide, specifically an acyl chloride, or an electron withdrawing group that renders the monomer electrophilic. Suitable electron withdrawing groups include halogenated species F, Cl, Br, or I. Species 2,5,8,9,11-22 in FIG. 19 show monomers where Y could be a halogen. For the purposes of the current invention, when Z is an electrophile or a leaving group that makes the monomer an electrophile, then Y is a nucleophile, and, when Z is a nucleophile, then Y is an electrophile or a leaving group that makes the monomer an electrophile. When Y is an electrophile, or an electron withdrawing group that makes the monomer electrophilic, including F, Cl, Br, or I, then it may be particularly advantageous to combine a rigid monomer from Chart 2 present in the second reactive monomer solution with any of the monomers described above in Chart 1 which are suitable for use in the first reactive monomer solution, such as polyamines, or polyphenols, to form the separating layer.

In a further embodiment of this invention, the separating layer comprises a network comprised of but not limited to, a polyester, a polyether, a polyamide, a polyimide or a mixture thereof. The polyester, polyamide, polyether or polyimide can be aromatic or non-aromatic. For example, the polyester can comprise residues of a phthaloyl (e.g. terephthaloyl or isophthaloyl) halide, a trimesoyl halide, or a mixture thereof. In another example, the polyester can comprise residues of a polyphenol containing a spiro-contorted centre, or bridged ring moieties or sterically congested single covalent bonds around which there is restricted rotation, or a mixture thereof. Wherein, a concave monomer may include but is not limited to small oligomers (n=0-10) of a polymer with intrinsic microporosity (PIM) containing nucleophilic or electrophilic reactive groups. One of skill in the art can choose suitable PIMs oligomers with reactive groups able to undergo an interfacial polymerisation reaction, which include but are not limited to polyphenols or polyamines (e.g. 25 and 26 in FIGS. 18A-C). In a further embodiment, the separating layer comprises residues of a trimesoyl halide and residues of a tetraphenol with a spiro-contorted centre. In a further embodiment, the film comprises residues of trimesoyl chloride and 5,5',6,6'-Tetrahydroxy-3,3,3',3'-tetramethyl-1,1'-spirobisindane (TTSBI, monomer 1 in FIGS. 18A-C). In a further aspect, the film comprises the reaction product of trimesoyl chloride and the sodium salt of 5,5',6,6'-Tetrahydroxy-3,3,3',3'-tetramethyl-1,1'-spirobisindane (TTSBI).

The first reactive monomer solution may comprise an aqueous solution of monomer, and or a rigid monomer (see FIG. 19 for examples), and or a concave monomer (see FIGS. 18A-C for examples), including, but not limited to a polyphenol with concave shape. This aqueous polyphenol solution may also contain other components, such as polyhydric compounds as disclosed in U.S. Pat. No. 4,830,885. Examples of such compounds include ethylene glycol, propylene glycol, glycerine, polyethylene glycol, polypropylene glycol, and copolymers of ethylene glycol and propylene glycol. The aqueous polyphenol solution may also contain polar aprotic solvents.

Aqueous monomer solutions may include, but are not limited to, an aqueous solution containing a salt of 5,5',6,6'-Tetrahydroxy-3,3,3',3'-tetramethyl-1,1'-spirobisindane (TTSBI), an alternative aqueous monomer solution, and/or combinations thereof. Concentrations of solutions used in the interfacial polymerzation may be in a range from about 0.01 weight % to about 30 weight %. Preferably, concentrations of the interfacial polymerization solutions may be in a range from about 0.1% weight % to about 5 weight %. Further, aqueous monomer solutions may be rendered acidic or basic by addition of appropriate reagents, so that the monomers are rendered soluble as acidic or basic salts.

The second reactive monomer solution may contain monomers with or without concavity (see FIGS. 18A-C for examples), or/and oligomers of PIMs, and or a rigid monomer (see FIG. 19 for examples). Monomers in the second solution, include, but are not limited to polyfunctional acyl halides such as trimesoyl chloride, or/and other monomers including but not limited to polyfunctional haloalkylbenzenes, such as 1,3,5-tris(bromomethyl)benzene, or/and rigid monomers with electrophilic or nucleopihilic reactive groups (assigned as Y) which can undergo interfacial polymerization (see FIG. 19 for examples of rigid monomers) including but not limited to polyfuncional halobenzenes, such as 2,3,5,6-tetrafluoroterephthalonitrile, or a mixture thereof dissolved in a nonpolar solvent such as hexane, heptane, toluene or xylene. Further, the second reactive monomer solution may include, but is not limited to, a xylene solution of iso-phthaloyl dichloride, sebacoyl chloride, an alternative organic monomer solution, and/or combinations thereof. The disclosed interfacial polymerization reaction time in step (b) may vary. For example, an interfacial polymerization reaction time may be in a range from about 5 seconds to about 48 hours.

Optionally, a capping step (c) may be carried out, in which unreacted groups in the polymer network are capped to modify the surface chemistry of the composite membrane. It comprises contacting the membrane with a solution containing capping monomers, which may include alcohols, including but not limited to R—OH, Ar—OH, alcohols with siloxane-substituents, alcohols with halo-substituents including fluorine $R_F$OH, where R includes but is not limited to alkyl, alkene, $R_F$, H, Si—O—Si. Amines may also be used as capping monomers and may include but are not limited to R—$NH_2$, Ar—$NH_2$, amines with siloxane-substituents, amines with halo-substituents including fluorine $R_F NH_2$, where R includes but is not limited to alkyl, alkene, $R_F$, H, Si—O—Si. The capping medium may comprise a solution containing R-acyl halides or Ar-acyl halides, where R includes but is not limited to alkyl, alkene, $R_F$, H, Si—O—Si.

A quenching step (d) includes contacting or treating the membrane after the interfacial polymerisation reaction with a quenching medium which may include but is not limited to water.

Optionally, a post treatment step (e) comprises curing the membrane with temperature or with microwaves. Optionally, a post treatment step (f) comprises contacting the composite membranes prior to use for nanofiltration with an activating solvent, including, but not limited to, polar aprotic solvents. In particular, activating solvents include DMAc, NMP, DMF and DMSO. The activating solvent in this art is defined as a liquid that enhances the composite membrane flux after treatment. The choice of activating solvent depends on the separating layer and membrane support stability. Contacting may be effected through any practical means, including passing the composite membrane through a bath of the activating solvent, or filtering the activating solvent through the composite membrane.

The second conditioning agent applied in step (g) is optionally impregnated into the membrane by immersing the TFC membrane in a water or organic solvent bath or baths comprising the second conditioning agent.

The resultant high flux semipermeable network TFC membranes with intrinsic microporosity of the invention can be used for gas separation or nanofiltration operations, particularly in nanofiltration in organic solvents, and more particularly nanofiltration operations in polar aprotic solvents.

Gas separations include the separation of binary, ternary and multicomponent mixtures including oxygen, nitrogen, hydrogen, carbon dioxide, methane.

A variety of membrane shapes are useful and can be provided using the present invention. These include but are not limited to spiral wound, hollow fibre, tubular, or flat sheet type membranes. The membrane of the present invention can be configured in accordance with any of the designs known to those skilled in the art, such as spiral wound, plate and frame, shell and tube, and derivative designs thereof.

The following examples illustrate the invention.

EXAMPLES

In the following examples 1-3, nanofiltration performance of the inventive membranes was evaluated according to flux profiles and molecular weight cut off (MWCO) curves. All nanofiltration experiments were carried out at 30 bar using a cross-flow filtration system. Membrane discs, of active area 14 $cm^2$, were cut out from flat sheets and placed into 4 cross flow cells in series. Permeate samples for flux measurements were collected at intervals of 1 h, and samples for rejection evaluations were taken after steady permeate flux was achieved. The MWCO was determined by interpolating from the plot of rejection against molecular weight of marker compounds. The solute rejection test was carried out using a standard feed solution comprised of a homologous series of styrene oligomers (PS) dissolved in the selected solvent. The styrene oligomer mixture contained 1-2 g $L^{-1}$ each of PS 580 and PS 1090 (Polymer Labs, UK), and 0.01 g $L^{-1}$ of α-methylstyrene dimer (Sigma-Aldrich, UK). Analysis of the styrene oligomers was done using an Agilent HPLC system with UV/Vis detector set at a wavelength of 264 nm. Separation was achieved using a reverse phase column (C18-300, 250×4.6 mm). The mobile phase consisted of 35 vol % analytical grade water and 65 vol % tetrahydrofuran with 0.1 vol % trifluoroacetic acid.

Solvent flux (J) was determined by measuring permeate volume (V) per unit area (A) per unit time (t) according to the following equation:

$$J = \frac{V}{A \cdot t} \quad (1)$$

The rejection ($R_i$) of markers was calculated from equation 2, where $C_{P,i}$ and $C_{F,i}$ correspond to styrene concentrations in the permeate and the feed respectively.

$$R_i = \left(1 - \frac{C_{P,i}}{C_{F,i}}\right) \cdot 100\% \quad (2)$$

In example 4, gas separation performance of the inventive membranes was evaluated according to pure gas permeation measurements with $CH_4$, $N_2$, $O_2$ and $CO_2$. The gas selectivities were measured for $CO_2/N_2$, $CO_2/CH_4$ and $O_2/N_2$. The gas permeabilities were measured with a soap-bubble meter at feed pressures of 40, 50 and 60 psig. The gas selectivity of the inventive membranes was calculated by:

$$\alpha_{CO_2/N_2} = \frac{(Pg/l)CO_2}{(Pg/l)N_2} \quad (3)$$

Where α is the selectivity and $P_g$ is the gas permeability.

Example 1

In the following example, membranes of the present invention are formed through interfacial polymerisation to form a polyester on a crosslinked polyimide support membrane, as follows:

Formation of Crosslinked Polyimide Support Membrane

A polymer dope solution was prepared by dissolving 24% (w/w) polyimide (P84 from HP Polymer AG) in DMSO and stirring overnight until complete dissolution. A viscous solution was formed, and allowed to stand for 10 hours to remove air bubbles. The dope solution was then cast on a polyester or polypropylene (Viledon, Germany) non-woven backing material taped to a glass plate using a casting knife (Elcometer 3700) set at a thickness of 250 μm. Immediately after casting, the membrane was immersed in a water bath where phase inversion occurred. After 15 minutes, it was changed to a new water bath and left for an hour. The wet membrane was then immersed in a solvent exchange bath (isopropanol) to remove any residual water and preparation solvents.

The support membrane was then crosslinked using a solution of hexanediamine in isopropanol, by immersing the support membrane in the solution for 16 hours at room temperature. The support membrane was then removed from the crosslinking bath and washed with isopropanol for 1 h to remove any residual hexanediamine (HDA).

The final step for preparing the crosslinked polyimide support membrane involved immersing the membrane overnight into a conditioning agent bath consisting of a volume ratio of 3:2 polyethylene glycol 400/isopropanol. The membrane was then wiped with tissue paper and air dried.

Figure 20:
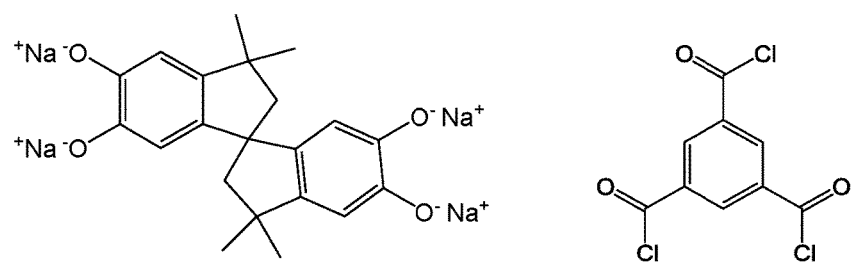
FIG. 20 shows the chemical structures of the monomers used for the interfacial polymerization reaction in Exmaple 1.

Formation of Thin Film Composite Membranes by Interfacial Polymerisation:

TFC membranes were hand-cast on the crosslinked polyimide support membrane through interfacial polymerization. The support membrane was taped to a glass plate and placed in an aqueous basic NaOH solution (pH=13) of 2% (w/v) 5,5',6,6'-Tetrahydroxy-3,3,3',3'-tetramethyl-1,1'-spirobisindane (98%, ABCR GmbH) for approximately 2 min. The phenoxide loaded support membrane was then rolled with a roller to remove excess solution. The saturated membrane support was then immersed in a solution of 0.1% (w/v) trimesoyl chloride (TMC, 98%, Sigma-Aldrich) in hexane. After 2 min of reaction, the resulting membranes were withdrawn from the hexane solution and rinsed with water (which corresponds to step (d) of the process defined herein, i.e. immersing the membrane into a quenching medium). The chemical structures of the monomers used for the interfacial polymerization reaction are shown in FIG. 20.

Membrane identification codes for the TFC membranes prepared in this Example are as follows:

| Entry No. | Membrane | Membrane code |
|---|---|---|
| 1 | TFC membrane prepared on crosslinked PI as support | TFC-PIMs-PI-n |
| 2 | Cured TFC membrane prepared on crosslinked PI as support | TFC-PIMs-PI-oven-n |

Where n identifies membranes made in independent batch n.

Curing of TFC Membranes in the Oven (Step e)

A post-formation treatment step was carried out on the composite membranes in which the membranes were cured in the oven at 85° C. for 10 minutes.

Composite Membrane Performance

The performance of TFC membranes in DMF, THF, acetone, methanol and toluene were evaluated with and without curing with temperature. The rejection curves and fluxes for the TFC membranes in DMF/PS solution, THF/PS solution, acetone/PS solution, methanol/PS solution and toluene/PS solution with and without curing in the oven are shown in FIGS. 1 to 10. It is clear that curing the membranes at 85° C. increases rejection.

Example 2

TFC membranes were prepared on PEEK support membranes, as follows:

Fabrication of Membrane Supports from Polyetheretherketone (PEEK):

A polymer dope solution was prepared by dissolving 12.3% (w/w) PEEK (VICOTE 704, a polyether ether ketone (PEEK) polymer, from Victrex) in 79.4% methane sulfonic acid (MSA) and 8.3% sulfuric acid ($H_2SO_4$). The solution was stirred overnight until complete dissolution. A viscous solution was formed, and allowed to stand for 10 hours to remove air bubbles. The solution was then cast on a polyester non-woven backing material taped to a glass plate using a casting knife (Elcometer 3700) set at a thickness of 250 μm. Immediately after casting, the membrane was immersed in a water bath where phase inversion occurred. After 15 minutes, it was changed to a new water bath and left for an hour. The wet membrane was then immersed in a water bath to remove any residual preparation solvents.

The final step for preparing the PEEK support membrane involved immersing the membrane overnight into a conditioning agent bath consisting of a volume ratio of 3:2 polyethylene glycol 400/isopropanol. The membrane was then wiped with tissue paper and air dried.

TFC membranes were fabricated as per EXAMPLE 1, on top of the PEEK support membrane. The TFC membranes were cured in the oven at 85° C. for 10 minutes as per EXAMPLE 1.

Membrane identification codes for the TFC membranes prepared in this Example are as follows:

| Entry No. | Membrane | Membrane code |
|---|---|---|
| 3 | Cured TFC membrane prepared on crosslinked PI as support | TFC-PIMs-PEEK-oven-n |

Where n identifies membranes made in independent batch n.

Composite Membrane Performance

The performance of TFC membranes cured with temperature was evaluated in acetone, THF, toluene and heptane. The rejection curves and fluxes for the cured TFC membranes in acetone/PS, THF/PS, toluene/PS, and heptane/PS solutions are shown in FIGS. 11, 12, 13 and 14 respectively.

Example 3

In this particular example TFC membranes were prepared on PBI support membranes, as follows:

Fabrication of membrane supports from polybenzimidazole (PBI):

A polymer dope solution was prepared by diluting a commercial dope solution of 26 wt % PBI dissolved in DMAc (trade name: Celazole®) to 15 wt % with DMAc. The solution was stirred for 4 h until complete dissolution. A viscous solution was formed, and allowed to stand for 10 hours to remove air bubbles. The solution was then cast on a polypropylene non-woven backing material taped to a glass plate using a casting knife (Elcometer 3700) set at a thickness of 250 μm. Immediately after casting, the membrane was immersed in a water bath where phase inversion occurred. After 15 minutes, it was changed to a new water bath and left for an hour. The wet membrane was then immersed in a water bath to remove any residual preparation solvents.

The final step for preparing the PBI support membrane involved immersing the membrane overnight into a conditioning agent bath consisting of a volume ratio of 3:2 polyethylene glycol 400/isopropanol. The membrane was then wiped with tissue paper and air dried.

TFC membranes were fabricated as per EXAMPLE 1, on top of the PBI support membranes. The TFC membranes were cured in the oven at 85° C. for 10 minutes as per EXAMPLE 1. Membrane identification codes for the TFC membranes prepared in this Example are as follows:

| Entry No. | Membrane | Membrane code |
|---|---|---|
| 4 | TFC membrane prepared on crosslinked PBI as support | TFC-PIMs-PBI-oven-n |

Where n identifies membranes made in independent batch n.

Composite Membrane Performance

Figure 15:
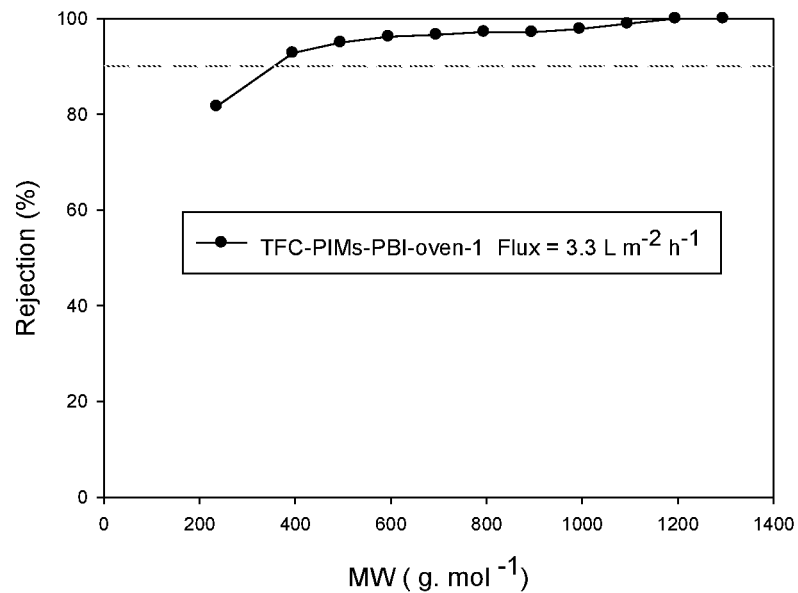
FIG. 15 shows the MWCO curve and flux for a TFC-IP-PIMs membrane prepared on a PBI support membrane. The TFC membrane has been cured in an oven at 85° C. for 10 minutes. Nanofiltration of a feed solution comprising polystyrene oligomers dissolved in THF has been performed at 30 bar and 30° C.
Figure 16:
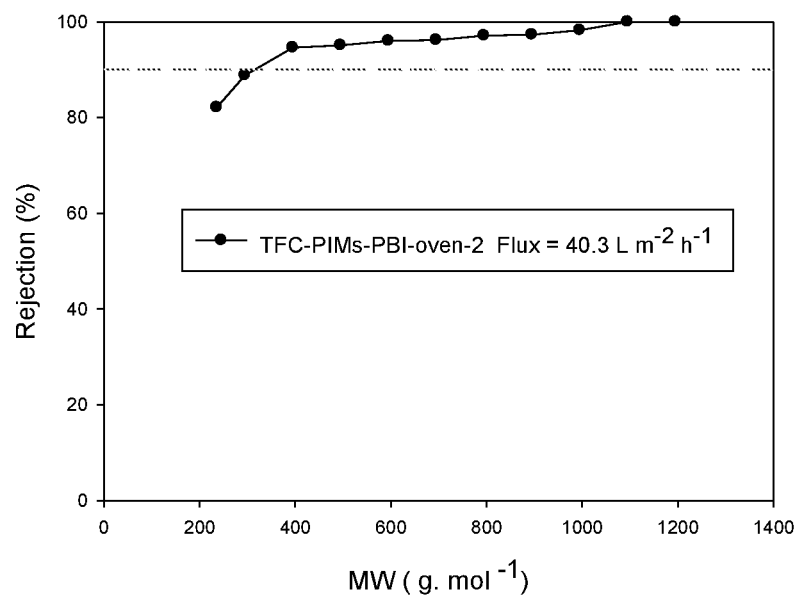
FIG. 16 shows the MWCO curve and flux for a TFC-IP-PIMs membrane prepared on a PBI support membrane. The TFC membrane has been cured in an oven at 85° C. for 10 minutes. Nanofiltration of a feed solution comprising polystyrene oligomers dissolved in acetone has been performed at 30 bar and 30° C.

The performance of TFC membranes cured with temperature was evaluated in acetone and THF. The rejection curves and fluxes for the cured TFC membranes in acetone/PS and THF/PS solutions are shown in FIGS. 15 and 16 respectively.

Example 4

TFC membranes were fabricated as per EXAMPLE 2 (i.e. with PEEK as support membrane without conditioning with PEG). The TFC membranes were cured in the oven at 85° C. for 10 minutes. Before the gas permeation membranes were immersed in MeOH, followed by hexane and left to dry overnight.

Composite Membrane Performance

Figure 17A:
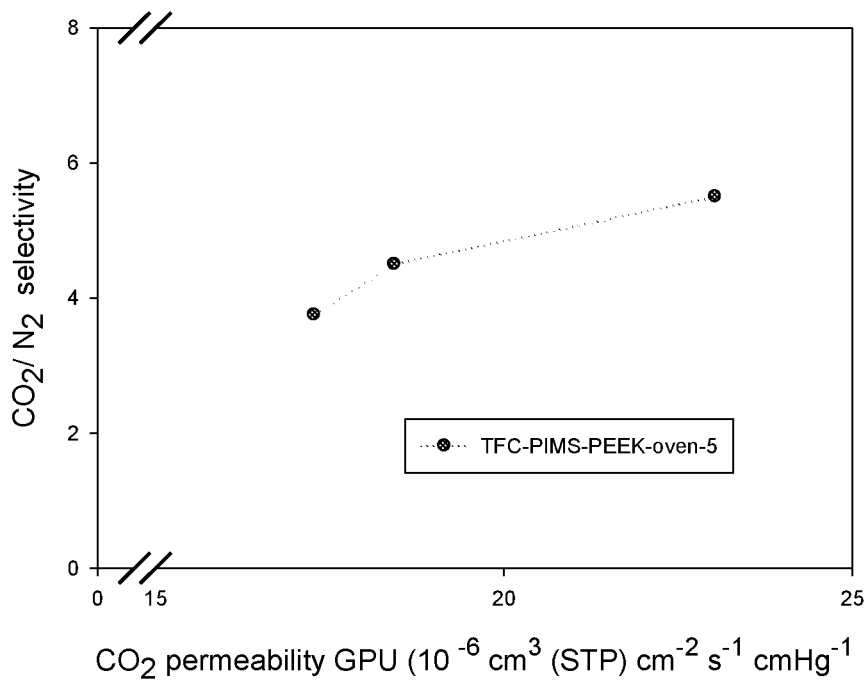
FIG. 17A shows $CO_2/N_2$ selectivity vs. $CO_2$ permeability.
Figure 17B:
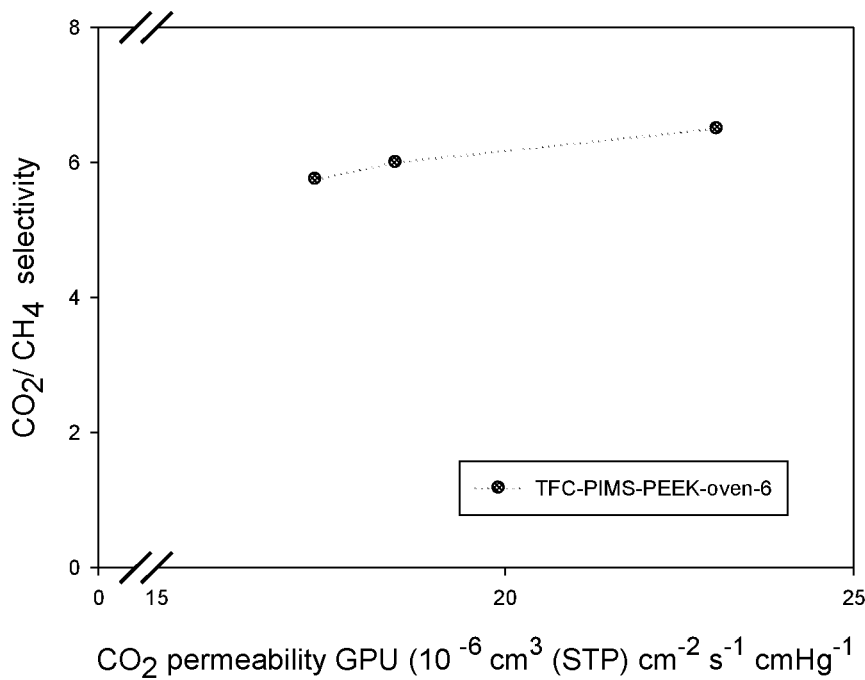
FIG. 17B shows $CO_2/CH_4$ selectivity vs. $CO_2$ permeability.
Figure 17C:
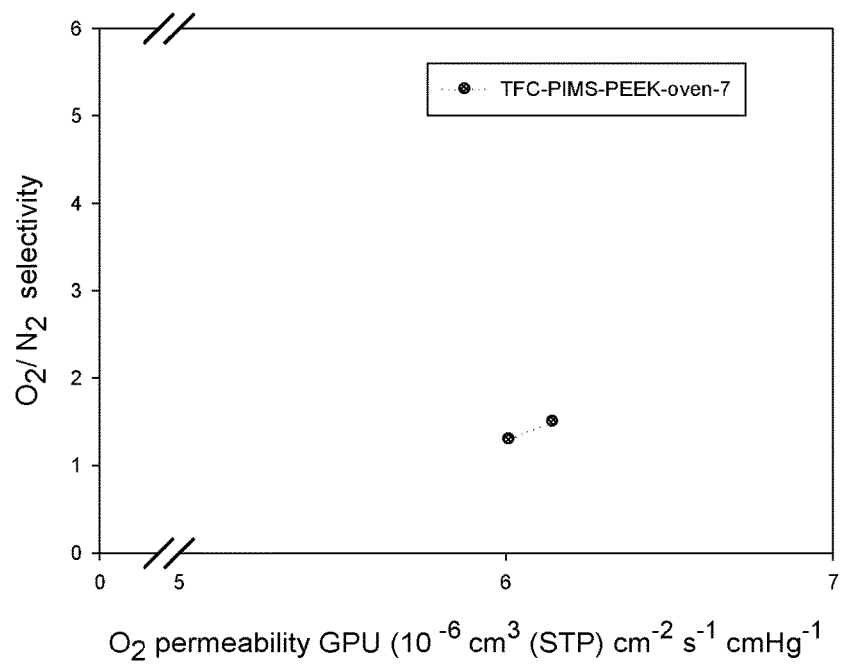
FIG. 17C shows $O_2/N_2$ selectivity vs. $O_2$ permeability.

The gas separation performance of TFC membranes cured with temperature was evaluated for $N_2$, $CO_2$, $CH_4$ and $O_2$. The permeabilities vs. selectivities at different pressures are shown in FIG. 17.

What is claimed is:

1. A thin film composite membrane suitable for use in nanofiltration operations in polar aprotic solvents, the thin film composite membrane comprising:
   a support membrane that is stable in polar aprotic solvents and is formed from a polymer selected from the group consisting of poly(ether ether ketone), polybenzimidazole and crosslinked polyimide; and
   a separating layer disposed on top of the support membrane, wherein the separating layer is the interfacial polymerisation product of first and second reactive monomers, at least one of the first and second reactive monomers having concavity, wherein the interfacial polymerization product is a network polyester polymer having intrinsic microporosity, said intrinsic microporosity being defined as a continuous network of interconnected intermolecular voids, said voids arising from the structure of the polymerised first and second reactive monomers.

2. A membrane according to claim 1, wherein the support membrane is impregnated with a conditioning agent that is a low-volatility organic liquid.

3. A membrane according to claim 1, wherein the membrane is a temperature or microwave cured membrane.

4. A membrane according to claim 1, wherein the composite membrane is treated with an activating solvent being a polar aprotic solvent prior to use in nanofiltration.

5. A membrane according to claim 1, wherein the at least one of the first and second reactive monomers having concavity is selected from a di- or poly-nucleophile, or a di- or poly-electrophile having two or more functional groups.

6. A membrane according to claim 1, wherein the at least one of the first and second reactive monomers having concavity comprises at least one of a spiro-contorted centre, a bridged ring moiety and a sterically congested single covalent bonds around which there is restricted rotation.

7. A membrane according to claim 1, wherein the at least one of the first and second reactive monomers having concavity is selected from one or more of the group consisting of 1,1-spirobisindanes, 9,9-spirobisfluorenes, bis-naphthalenes, 1,1-spirobis,2,3,4-tetrahydro-naphthalenes, and 9,10-ethanoanthracene.

8. A membrane according to claim 1, wherein in the polymerization product adjacent reactive monomers having concavity are held in non-coplanar orientation.

9. A membrane according to claim 1, wherein the separating layer comprises the reaction product of trimesoyl chloride and the sodium salt of 5,5',6,6'-Tetrahydroxy-3,3,3',3'-tetramethyl-1,1'-spirobisindane.

10. A membrane according to claim 1, wherein the support membrane is a crosslinked polyimide support membrane and the polyimide used to form the support membrane is at least one copolymer selected from the group consisting of:
   (a) the co-condensate of benzophenone 3,3',4,4'-tetracarboxylic acid dianhydride and a mixture of:
      (i) di(4-aminophenyl) methane and toluene diamine or
      (ii) a mixture of 4,4'-methylenebis (phenyl isocyanate) and toluene diisocyanate; and
   (b) the condensate of 1H,3H-Benzo[1,2-c:4,5-c']difuran-1,3,5,7-tetrone with 5,5'-carbonylbis [1,3-isobenzofurandione], 1,3-diisocyanato-2-methylbenzene and 2,4-diisocyanato-1-methylbenzene.

11. A membrane according to claim 1, wherein the support membrane comprises crosslinks formed from the reaction of amines selected from the group consisting of aliphatic amines, aliphatic-aromatic amines, and aromatic amines with a polyimide polymer.

12. A membrane according to claim 2, wherein the conditioning agent is selected from the group consisting of one or more of polyolefinic oils, silicone oils, polyalphaolefinic oils, polyisobutylene oils, synthetic wax isomerate oils, ester oils and alkyl aromatic oils solvent refined oils, hydroprocessed mineral oils, petroleum wax isomerate oils, vegetable fats and oils, decanol, dodecanol, heptadecanol, glycerols, polypropylene glycols, polyethylene glycols, and polyalkylene glycols.

13. A membrane according to claim 1, wherein the at least one of the first and second reactive monomers having concavity has any of the following structures:

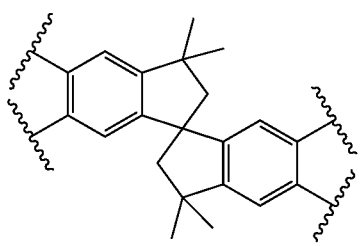

-continued
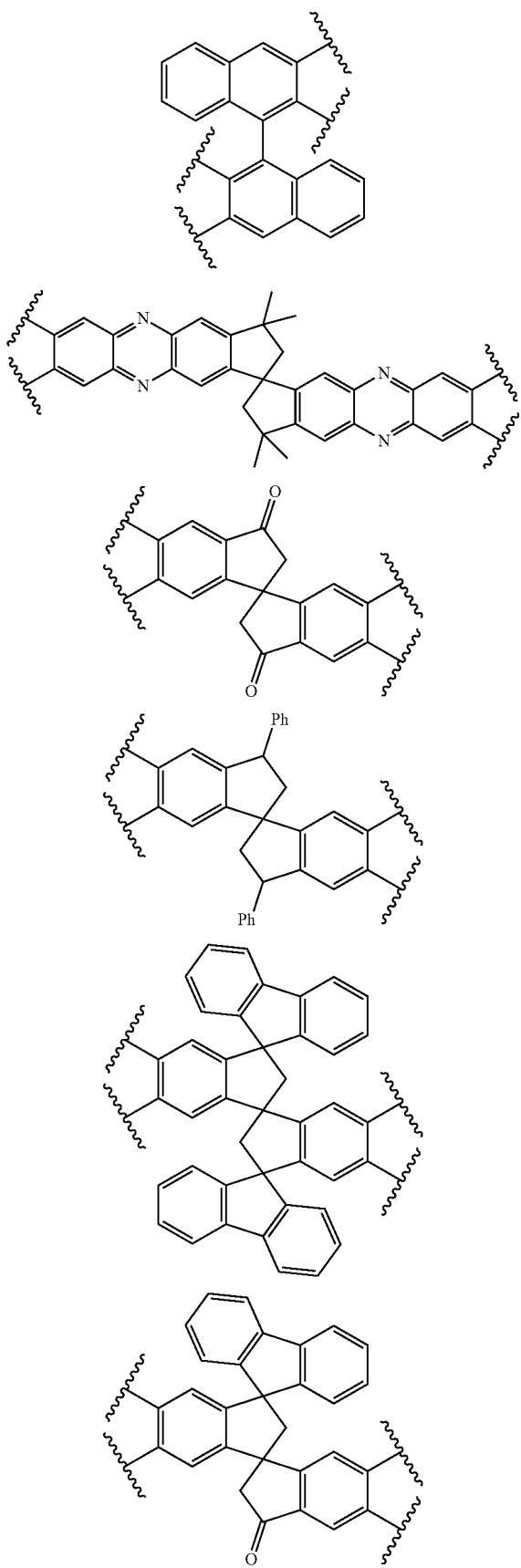
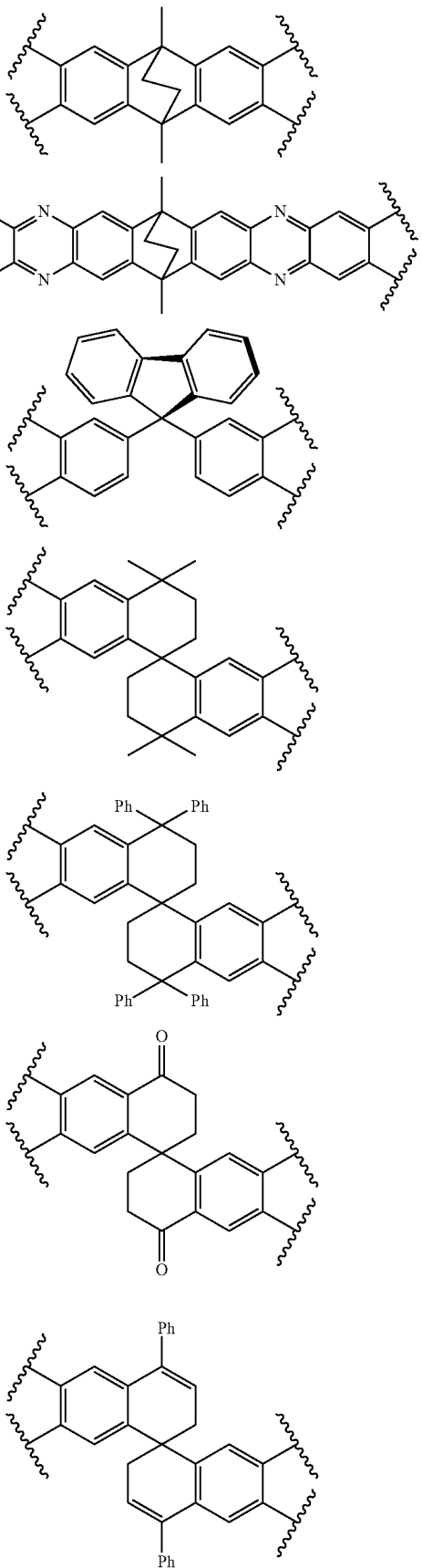

-continued
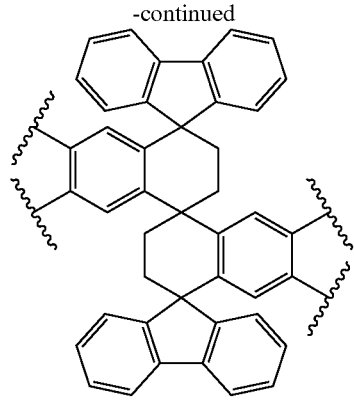
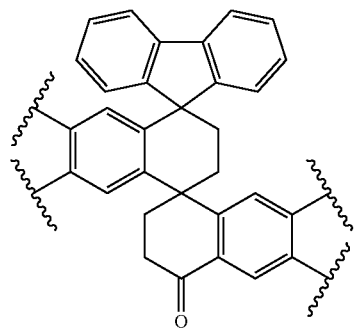
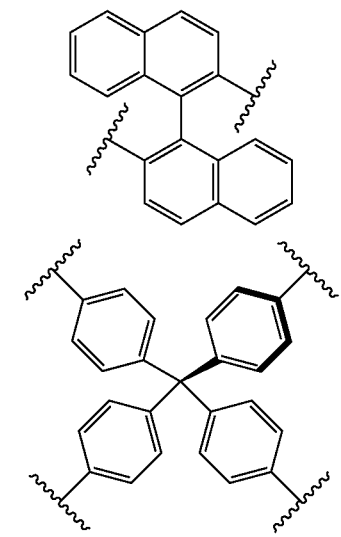
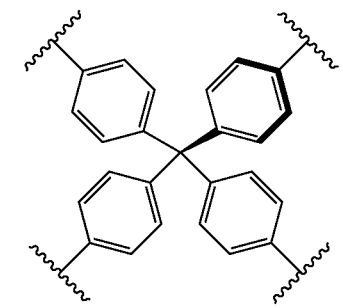
-continued
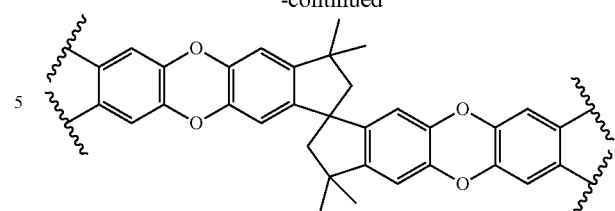
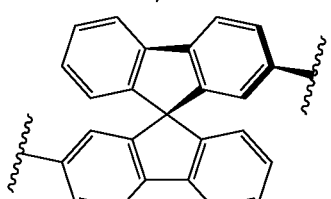
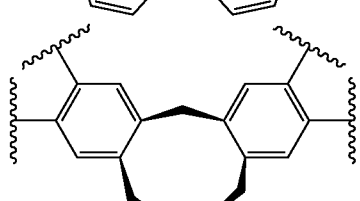
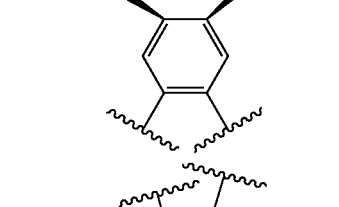
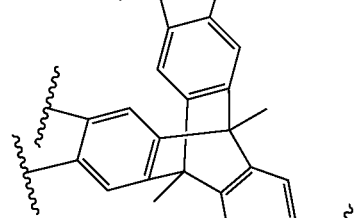
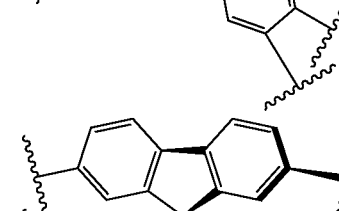
14. The thin film composite membrane of claim 1, wherein the separating layer has a thickness in the order of nanometers.
* * * * *